(12) United States Patent
Waelbroeck et al.

(10) Patent No.: US 8,069,106 B2
(45) Date of Patent: Nov. 29, 2011

(54) BLOCK TRADING SYSTEM AND METHOD PROVIDING PRICE IMPROVEMENT TO AGGRESSIVE ORDERS

(75) Inventors: Henri Waelbroeck, Scarsdale, NY (US); Fred J. Federspiel, Larchmont, NY (US); John E. Lopez, Nesconset, NY (US)

(73) Assignee: Pipeline Financial Group, Inc., New York, NY (US)

( * ) Notice: Subject to any disclaimer, the term of this patent is extended or adjusted under 35 U.S.C. 154(b) by 1054 days.

(21) Appl. No.: 10/799,205

(22) Filed: Mar. 11, 2004

(65) Prior Publication Data
US 2004/0210511 A1    Oct. 21, 2004

Related U.S. Application Data

(63) Continuation-in-part of application No. 10/603,100, filed on Jun. 24, 2003, which is a continuation-in-part of application No. 09/870,845, filed on May 31, 2001, now abandoned, which is a continuation-in-part of application No. 09/750,768, filed on Dec. 29, 2000, which is a continuation-in-part of application No. 09/585,049, filed on Jun. 1, 2000.

(51) Int. Cl.
*G06Q 40/00* (2006.01)
(52) U.S. Cl. .................................................. 705/37
(58) Field of Classification Search .................. 705/37, 705/35, 36 R, 38, 39, 40
See application file for complete search history.

(56) References Cited

U.S. PATENT DOCUMENTS

| | | | | | |
|---|---|---|---|---|---|
| 3,648,270 | A | * | 3/1972 | Metz et al. | 345/24 |
| 5,136,501 | A | * | 8/1992 | Silverman et al. | 705/37 |
| 5,689,652 | A | * | 11/1997 | Lupien et al. | 705/37 |
| 5,717,989 | A | * | 2/1998 | Tozzoli et al. | 705/37 |
| 5,724,524 | A | * | 3/1998 | Hunt et al. | 705/37 |
| 5,794,207 | A | * | 8/1998 | Walker et al. | 705/1 |
| 5,806,044 | A | * | 9/1998 | Powell | 705/14.39 |

(Continued)

FOREIGN PATENT DOCUMENTS
JP          2002-049759          2/2002
(Continued)

OTHER PUBLICATIONS

Price impacts of Block Trading on the NY Stock Exchange, Alan Kraus and Hans R Stoll, Journal of Finance, vol. 27, No. 3. Jun. 1972, pp. 569-588.*

(Continued)

*Primary Examiner* — Bruce I Ebersman
(74) *Attorney, Agent, or Firm* — Cowan, Liebowitz & Latman; Steven D. Underwood

(57) ABSTRACT

The present invention comprises systems and methods for facilitation of electronic securities trading. A preferred system embodiment comprises a trade facilitation computer system comprising a facilitator module, a financial information exchange server, a transactional database, and an analytics server operative to calculate reference prices for securities. A preferred method embodiment comprises the steps of receiving market data for a security; calculating a reference price for the security; receiving a first order comprising a first price limit and a first quantity limit; receiving a second order contra to the first order and comprising a second price limit and a second quantity limit; and executing a trade comprising the first order and the second order at a price whose difference from the reference price is minimized, wherein the trade complies with the first and second price and first and second quantity limits.

16 Claims, 11 Drawing Sheets

U.S. PATENT DOCUMENTS

| | | | |
|---|---|---|---|
| 5,812,988 A * | 9/1998 | Sandretto | 705/36 R |
| 5,842,178 A * | 11/1998 | Giovannoli | 705/26 |
| 5,845,266 A | 12/1998 | Lupien et al. | |
| 5,873,071 A | 2/1999 | Ferstenberg et al. | |
| 5,924,082 A * | 7/1999 | Silverman et al. | 705/37 |
| 5,950,177 A * | 9/1999 | Lupien et al. | 705/37 |
| 6,211,880 B1 * | 4/2001 | Impink, Jr. | 345/418 |
| 6,236,979 B1 * | 5/2001 | Kawabata | 705/27 |
| 6,260,025 B1 * | 7/2001 | Silverman et al. | 705/37 |
| 6,285,983 B1 | 9/2001 | Jenkins | |
| 6,304,858 B1 | 10/2001 | Mosler et al. | |
| 6,317,728 B1 | 11/2001 | Kane | |
| 6,321,205 B1 * | 11/2001 | Eder | 705/7 |
| 6,321,212 B1 | 11/2001 | Lange | |
| 6,408,282 B1 | 6/2002 | Buist | |
| 6,421,653 B1 * | 7/2002 | May | 705/36 R |
| 6,578,014 B1 * | 6/2003 | Murcko, Jr. | 705/26 |
| 6,912,510 B1 * | 6/2005 | Shepherd | 705/37 |
| 6,985,883 B1 | 1/2006 | Togher et al. | |
| 7,003,486 B1 | 2/2006 | Condamoor et al. | |
| 7,035,819 B1 * | 4/2006 | Gianakouros et al. | 705/37 |
| 7,099,839 B2 * | 8/2006 | Madoff et al. | 705/37 |
| 7,110,974 B1 * | 9/2006 | Rust | 705/37 |
| 7,130,823 B1 | 10/2006 | Rayner et al. | |
| 7,136,834 B1 | 11/2006 | Merrin et al. | |
| 7,162,447 B1 * | 1/2007 | Cushing | 705/37 |
| 7,430,533 B1 * | 9/2008 | Cushing | 705/37 |
| 7,565,313 B2 * | 7/2009 | Waelbroeck et al. | 705/37 |
| 7,617,144 B2 * | 11/2009 | Madoff et al. | 705/37 |
| 2001/0044767 A1 * | 11/2001 | Madoff et al. | 705/37 |
| 2002/0019795 A1 * | 2/2002 | Madoff et al. | 705/37 |
| 2002/0035534 A1 * | 3/2002 | Buist et al. | 705/37 |
| 2002/0052827 A1 | 5/2002 | Waelbroeck | |
| 2002/0082967 A1 * | 6/2002 | Kaminsky et al. | 705/37 |
| 2003/0004859 A1 * | 1/2003 | Shaw et al. | 705/37 |
| 2003/0009411 A1 | 1/2003 | Ram | |
| 2003/0083973 A1 | 5/2003 | Horsfall | |
| 2003/0093343 A1 * | 5/2003 | Huttenlocher et al. | 705/35 |
| 2005/0075963 A1 * | 4/2005 | Balabon | 705/36 |

FOREIGN PATENT DOCUMENTS

| | | |
|---|---|---|
| WO | WO 02/097589 | 12/2002 |

OTHER PUBLICATIONS

Comments about block trading (20 pages, Webarchive.org Feb. 23, 1998).*
WO 02/097589 to Neubert Cleary, May 2002 priority May 30, 2001 (furnished by applicant into records).*
"The Journal of Portfolio Management, Structural Changes in Trading Stocks" by Bartley J. Madden, 1993.*
Volatility and Liquidity in futures markets by Peter R. Locke and Asani Sakar, Federal Reserve Bank of NY, Research Paper 9612, 1996.*
A Taxonomy of automated Trade Execution systems by Ian Domowitz, Journal of International Money and Finance, 1993, 12, pp. 607-631.*
PCT/ISA/210 for PCT/US04/19706 dated Dec. 20, 2005.
PCT/ISA/210 for PCT/US05/07463 dated May 11, 2007.
PCT/ISA/210 or PCT/US07/08745 dated Oct. 18, 2007.
EP Appln. No. 05729202 Supplementary European Search Report, Feb. 5, 2008.
Domowitz I: "A Taxonomy of Automated Trade Execution Systems", Journal of International Money and Finance of Butterworth Scientific, Guildford, GB, vol. 12, 1993, pp. 607-632.
Hendershott T: "Electronic Trading in Financial Markets", IT Pro, Jul./Aug. 2003, pp. 10-14.
Madden, Bartley J.; *Structural Changes in Trading Stocks*; The Journal of Portfolio Management; 1993, No. 10093; pp. 19-27.
Mar. 22, 2011 Japanese Office Action, that issued in Japanese Patent Application No. 2007-502909 and an English Translation of the Office Action is attached.

* cited by examiner

BLOCK TRADING SYSTEM AND METHOD PROVIDING PRICE IMPROVEMENT TO AGGRESSIVE ORDERS

CROSS-REFERENCE TO RELATED APPLICATIONS

This application is a continuation-in-part of U.S. patent application Ser. No. 10/603,100, filed Jun. 24, 2003, which is a continuation in part of U.S. patent application Ser. No. 09/870,845, filed May 31, 2001, now abandoned which is a continuation-in-part of U.S. patent application Ser. No. 09/750,768, filed Dec. 29, 2000, which is a continuation-in-part of U.S. patent application Ser. No. 09/585,049, filed Jun. 1, 2000. The entire contents of each of the above-listed applications are incorporated herein by reference.

FIELD OF THE INVENTION

The subject invention relates to a method for managing information to focus block-trading interests into a confidential crossing book, and executing block trades over a computer network such as the Internet.

BACKGROUND

In public securities markets, market mechanics and trading psychology create barriers to efficient information dissemination and price discovery. A market participant's decision to reveal information about his or her true price limits represents a tradeoff between the market impact cost of affecting price expectations and the opportunity cost of delaying or failing to execute a trade. As used herein, the term "market participant" refers to any person or firm with the ability to trade securities; examples of market participants include broker-dealers, institutions, hedge funds, statistical arbitrage and other proprietary trading operations, and private investors trading on electronic communication networks (ECNs).

By displaying a buyer's true price limit to one or more prospective sellers, for example, a market participant is in effect writing an option that either of the sellers may freely elect to execute; as long as this option is open it sets a lower bound on the market participants' expectations of what the fair trade price should be. Even if one of the sellers originally had a lower price expectation, this expectation is immediately changed when the buyer's price limit is known, the only remaining question being whether the fair price should be even higher. Indeed, by disclosing a high price the buyer indicates an eagerness to acquire the stock, which may reflect information that has yet to come to the seller's attention.

Broker-dealers cope with this problem by carefully managing expectations of parties on both sides of a trade until a fair price has been discovered, and then proposing a fair trade price that can be satisfactory to both. Today such agency orders are increasingly delivered electronically. Orders identified as "not held" are not displayed on the public market, to avoid the above-mentioned impact on price expectations. Brokers may receive crossing not held orders on the buy and sell sides, and find themselves in the position of having to choose a fair price to execute the crossed trade, somewhere between the limits of the two orders. Discretion is normally used when handling such a situation. For example, if a buyer has placed a large block buy order at $30.00 at 10:00 AM, and the market has since fallen to a current best offer of $29.80, a large block sell order at $29.99 would most likely not be automatically crossed at this price, since it now seems expensive compared to the current market; the buyer's limit is interpreted as an instruction to stop buying if the market price were to rise above this level. But a block sell order at $29.82, which also crosses the buyer's much higher limit, would probably be accepted, while one at $29.85 might prompt the broker to call the buyer.

This human intermediation comes at a steep price, both in terms of commissions paid and in terms of information leakage to individuals who have close relationships with aggressive trading firms such as hedge funds. This has fueled a desire from large institutions to find an alternate marketplace where they can post their orders themselves, without discretionary intervention by a traditional broker.

Electronic markets such as NASDAQ or Electronic Communication Networks (ECNs) are not well equipped to handle the price discovery problem for large block trades. In its simplest form, an electronic marketplace simply displays the trading interests of the buyers and sellers to their subscribers, which then have the ability to execute such buy and sell interests. To avoid impacting the market participants' price expectations, users of electronic markets typically place relatively small orders at passive prices, and patiently wait for others to execute them, or take a somewhat more aggressive stance and execute the orders that others have posted on the other side of the spread.

Tools are available to "slice and dice" larger orders into a large number of small pieces that can be worked in this manner, but their activity inevitably reveals the existence of the larger order to those who are skilled in the art of statistical analysis. Such traders develop and optimize trading strategies that deliberately detect large confidential orders as they are being worked, and generate profits by anticipating the market impact that those orders are likely to cause. The simplest such strategy is that of taking a position ahead of the larger order and relying on its continued presence to push the price in a profitable direction. By trading in the same direction as the large order, such parasitic strategies end up exacerbating the price movements that would naturally have been caused by the large order in the first place. The end result is not altogether different from that of posting a large order on the New York Stock Exchange: in the latter case, floor traders join in to "participate" with an auctioned order, or directly step in front to intercept the liquidity that it was able to attract. The terms "penny-jumping" and "front-running" have come to be applied to describe this type of parasitic strategy on the NYSE floor and on electronic marketplaces alike.

Some ECNs offer more sophisticated order types in an attempt to alleviate the front-running problem. Some of these (e.g., discretion orders), simply try to mask the true price limit by showing one price but grabbing priority to execute up to a higher confidential price limit. These suffer from simple counter-strategies, such as that of spraying small orders at different price levels to see when an order gets executed at an undisplayed price level. Other sophisticated order types use minimum quantity conditions in conjunction with hidden discretionary prices to avoid detection by sprays of tiny orders. Since no price is displayed there is no "price revelation" in the traditional sense. Yet, a block trader with a contra interest can discover the first order's limit, and would indeed have a fiduciary obligation to do so, simply by repeatedly placing and canceling orders at steadily worse price levels until the order intersects with the resident order's limit. Thus, although price expectations are not altered prior to the trade, a trader who places a large hidden order on an ECN to buy at $30.00 should indeed expect to trade at $30.00, even if the seller would otherwise have been willing to accept any price down to $29.90.

As a result, electronic books such as SuperMontage have difficulty attracting significant size orders at attractive price levels, as most participants quickly learn that it is more profitable to lurk in the shadows and take what prices others are willing to show, or display small sizes at a time. This has led to an evolution of the marketplace wherein the average trade size has fallen steadily to about 500 shares while the total traded volume and average institutional order sizes have been increasing.

In this environment, there is an acute need for an electronic trading system that rewards traders who are willing to confidentially express their true price aggression with the benefit of price improvement when the contra party is similarly aggressive. In such a block trading solution, the optimal strategy for aggressive traders should be to place their orders with an aggressive price, while passive traders would naturally be best served by placing passively priced orders.

Yet answering such a need cannot come at the expense of the main perceived advantage of electronic trading systems over traditional marketplaces, which is the ability to instantly execute trades with no human intermediation or pre-trade information leakage.

The challenge, in short, is to protect an order that is electronically executable at an aggressive limit price from actually being executed at such an aggressive price when the contra was in fact willing to be aggressive as well.

To tip the scale back in favor of the party who has placed an aggressive order, without losing the perceived advantage of electronic-speed executions and without the mediation of a third party, one must identify value items that can strengthen the negotiating position of a party who is willing to express an aggressive price. One such value item is information. Related application Ser. No. 10/603,100, filed Jun. 24, 2003; Ser. No. 09/870,845, filed May 31, 2001; Ser. No. 09/750,768, filed Dec. 29, 2000 and Ser. No. 09/585,049, filed Jun. 1, 2000 (the entire contents of each are incorporated herein by reference) show how parties willing to confidentially disclose Certified Trading Interest information to a computer system can gain the right to receive Certified Trading Interest information from other parties who are interested in trading with them. This opens the possibility of reversing the arrow of information flow when a trader places an aggressively-priced order in a trading system: the aggressive price is not shown to third parties, but instead helps the trader attract information from third parties with more passive offers

SUMMARY

The system of the present invention overcomes the limitations of known automated trading systems by enabling market participants to place aggressively-priced orders into an electronic matching book without disclosing such limit price to a contra party, or falling victim to strategies that freely detect such a limit price, and to receive immediate executions when matching orders are found, priced as close to a published reference price such as the National Market midpoint (or other reference price) as the two orders' limits will permit. Preferred embodiments enable a market participant to: (1) place hidden orders in the system's electronic matching book without disclosing the side and price of the order to the public; (2) receive immediate executions against matching contra orders in the book ranked in price time priority, at a price which is as close to the National Market midpoint (or other reference price) as the matching orders will permit; (3) cause the system to issue an "ACTIVE SYMBOL" indicator to induce other participants to place orders in this security; (4) receive a "CONTRA PRESENT" notification when an order is priced at least as aggressively as the National Market midpoint (or other reference price), and a second market participant places a passive contra order within a system-displayed Block Price Range, (5) increase an order's price at any time if it was already priced at least as aggressively as the National Market midpoint (or other reference price), or after a delay of (5 seconds, say) if it was priced more passively than the midpoint, so that strategies that would aim to detect the true limit price of a standing order by successively canceling and replacing a contra order at increasingly aggressive prices are not applicable.

A preferred embodiment comprises a method for executing block trades in a fungible item that is traded on a public marketplace, such as a financial security, comprising the steps of: electronically calculating or receiving a reference price for a small quantity of a fungible item, such as the average of the best dealer quotes to buy and sell the fungible item; electronically storing the reference price; electronically displaying the reference price to participants; electronically receiving information from a first participant over the network, the information including a block order to buy or sell the fungible item; and electronically storing the information from the first participant in an electronic matching book. If the order can be matched with other orders previously entered within the electronic matching book ranked in price time priority, the method comprises executing a trade within the price and quantity attributes of the matched orders with a price that is as close to the reference price as possible and within the range allowed by both orders, and reporting the executed trade to the users and to clearing and regulatory entities. If an order is unmatched and the first order is priced more passively than the reference price and there exist resident contra orders from a second market participant(s) priced more aggressively than the reference price (but not aggressively enough to match the first participant's order), the method comprises electronically sending a CONTRA PRESENT notification to the second market participant(s) to notify them of the existence of a passive order on the contra side; removing the CONTRA PRESENT notification whenever the second participant's order is canceled or modified to a price more passive than the reference price; continuously recalculating the reference price and re-pricing orders from first participants and second participants who elected to "peg" their orders to the reference price; and executing pegged orders against orders with a fixed price when a change in the reference price makes such an execution possible within the parameters of both orders, and reporting the executed trade to the users and to clearing and regulatory entities.

Advantageously, trades are executed in a manner that grants price improvement to traders who enter the most aggressive order, as determined by comparison to the reference price. For instance, if a first participant places an order to buy 3 cents above the reference price and a second participant places an order to sell 2 cents below the reference price, the trade would be executed at the reference price itself, giving the most price improvement to the order with a 3-cent aggression. If the buy order was 3 cents above the reference but the sell order was placed 1 cent above the reference price, the trade would be executed at the reference price plus 1 cent; in this case only the aggressive order receives price improvement. If the buy order was placed at the reference price and the sell order was placed 1 cent above the reference price, no trade can be executed but the buyer receives a CONTRA PRESENT notification. Since the release of this information prior to a trade could cause the first participant to pull back, a second participant who was in fact eager to trade could be left empty-handed. Such a trader would be most likely to achieve his or her trading objectives by placing the order with an aggressive limit. On the other hand, if such a second participant was, in fact, willing to wait for an opportunity to trade at a better price, then the CONTRA PRESENT notification serves a constructive role by inviting the first participant to consider a more aggressive price. In both cases, the aggressive trader is the beneficiary of the information contained in the CONTRA PRESENT notification, in sharp contrast with electronic markets where an aggressive trader leaks information to others in advance of a trade, often resulting in adverse market impact and low fill rates. Due to this reversal of the information flow, the CONTRA PRESENT notification creates an incentive for traders to express their true trading preferences, leading to greater liquidity and more efficient price discovery.

An alternate embodiment comprises the additional steps of: electronically calculating a Block Price Range (BPR); electronically storing the BPR on a computer readable medium; electronically sending data including the BPR and reference price information over a communication network such as the Internet; and displaying the data to a plurality of users through a Graphic User Interface. The alternate embodiment preferably maintains the BPR fixed for up to a definite period of time, such as 60 seconds, with exceptions when the reference price changes abruptly through events external to the system, and the reference price itself is updated continuously. In this alternate embodiment, in addition to the steps mentioned above, the system of the present invention electronically notifies users when a first participant places an order that does not match with any contra order currently in the system but is priced at least as aggressively as the BPR, i.e., if it is a buy order at or above the Block Bid, or a sell order at or below the Block Offer, wherein the Block Bid and Block Offer form the lower and upper extremities of the BPR, respectively, that there is an active interest to trade the fungible item within the subject system. In this alternate embodiment the notification that a contra is present is sent only if the contra's order is priced at least as aggressively as the BPR, and is removed if either of the two orders that have caused the contras present condition is subsequently found to be priced more passively than the BPR, either through changes in the reference price to which one or both orders may be pegged, or through a change in the BPR itself.

Another alternate embodiment functions as described in either of the two embodiments described above but additionally requires that a first participant who has entered an order that is passive in relation to the reference price must wait for an announced minimum amount of time, such as 5 seconds, prior to being allowed to replace the order with a more aggressive price. In this alternate embodiment, a second participant who may have been notified of the presence of a passive contra within the system can then elect to cancel or re-price the order to execute the first participant's counter-offer.

A schematic view of a preferred computer system embodiment of the present invention is given in FIG. 1.

The system preferably comprises a trade facilitation system 100. Said trade facilitation system 100 is connected to participants through a communication network 80 such as the Internet, and a financial information exchange network such as a FIX Network 90. System 100 receives market data from a vendor 60 through the vendor's network 70. Participants access the system through a graphic user interface (GUI) 20 installed at each participant's workstation. Orders are routed to an Execution Engine 50. Matching orders are traded automatically when received by said Execution Engine. A preferred embodiment comprises a Net Server subsystem 110 responsible for connectivity to each client GUI; a Financial Information Exchange (FIX) Server 120 to provide connectivity to back-office systems and client order management systems; and an Order Manager subsystem 130 responsible for implementing the order handling logic of the system as described herein. Facilitator module 140 creates information events intended to focus interest and steer users toward a trade. The trade facilitation system 100 keeps track of the status of its orders in a transactional database 150. The system determines the price aggression of orders in comparison to a reference price, such as the National Best Bid and Offer midpoint price, which is computed by an Analytics Server 160. In an alternate embodiment the system also measures price aggression with respect to a Block Price Range, which is then also computed by Analytics Server 160: the price of an order can be (a) more passive than the BPR, or (b) aggressive, meaning that the price is either within the BPR or more aggressive than the BPR. The Execution Engine 50 receives orders through the Communications Network 80 and electronically stores them in a transactional, fault tolerant database (the Book 51); it reports executions back to the trade facilitation system 100 over this same network. In an alternate embodiment, the Execution Engine 50 can be hosted locally as an additional component within the system 100.

Participants use a graphic user interface 20 to enter orders into the system. When said order is executed, the results are reported for processing to their sponsoring broker 95 and to their own firm's Order Management Systems (OMS) 10 using the FIX protocol.

All orders are preferably required to be "Large Block Orders" which means their size must be a multiple of a large block quantity. For example, if the Large Block Quantity were 100,000 the GUI only allows orders that are a multiple of 100,000 shares. The orders can be Limit or better, or pegged to a market indicator such as the midpoint between the best bid and offer on the National Market. All validated block orders are immediately routed to the Execution Engine 50, where they are stored in the Book 51. In an alternate embodiment, orders of any size are accepted.

A preferred embodiment processes orders on a first come first served basis. In an alternate embodiment, aimed at creating an additional incentive for traders to place aggressively priced orders, the system announces an accumulation period during which orders are received and queued without being considered for matching, followed by a trading period during which orders are placed into the Execution Engine 50 in price time priority, placing the buy orders first and subsequently sell orders, and executing them as described above when a match is detected on order entry. For example, the system may announce accumulation periods of 15 minutes with an execution period occupying the last second of each 15-minute interval. In this embodiment, the system alternates between accumulation periods and trading periods throughout the day, for example with accumulation periods 8:30:00-8:44:59; 8:45-8:59:59; 9:00-9:14:59; etc.

The GUI 20 enables a trader who has an interest in trading a large block in a given security to click on the security's symbol as displayed in a box on top of the main screen, to bring up an order entry dialog and automatically populate the fields of the order entry dialog in accordance with his or her pre-configured preferences. The trader will edit these fields as needed and press a button marked "Submit" to place the order.

If a newly entered order matches one or more prior book order(s) (the new order is in the same security, on the opposite side, and with a price that equals or betters a standing book order), the Execution Engine 50 automatically ranks contra orders in price time priority and executes trades between the incoming order and standing order(s) until either the former or the latter is (are) completely filled, at the price within the limits of the two orders that is closest to the system's current reference price, and electronically reports the trade to the Automated Confirmation and Transaction (ACT) 40 service for the consolidated tape, and to the sponsoring broker's clearing firm 30. Notice of the execution is also sent to the graphic user interface 20 to notify the trader of the trade. If on the other hand there is no matching order in the book, the new order remains stored in the book as a standing order. In a preferred embodiment clients can elect to have their orders sponsored by a third party broker, in which case the trades are also reported to the sponsoring broker's back-office systems 95 via FIX. In a preferred embodiment, a participant who enters a passive order (as compared to the current reference price) is permitted to increase the price aggression of that order only after a minimum delay (of 5 seconds, say). In an alternate embodiment the user may replace the order immediately but the replaced order will be eligible for matching only after the specified minimum delay. In yet another alternate embodiment all orders are ineligible for matching during a system published accumulation period, and are loaded into the Execution Engine 50 in order of side, price aggression and time, after the expiration of an accumulation period. In yet another embodiment traders may place orders and modify prices at any time, and system operators monitor whether specific users engage in the practice of "feeling out" resident orders' limits (and, if so, cancel their accounts).

In order to increase the likelihood of trades, the system's Order Manager 130 is connected to a facilitator module 140, which automatically takes action when a newly-entered order does not find a match but is stored in the book 51 as a standing order. In a preferred embodiment, upon entry of a buy (sell) order, the facilitator notifies standing sell (buy) orders that are priced at or below (at or above) the reference price that a contra order has been entered, by means of a CONTRA PRESENT notification. In an alternate embodiment, all standing orders on the contra side to an incoming order are eligible to receive such a notification.

In an alternate embodiment, only orders that are reasonably priced are subject to facilitation; a reasonable price range for trading large blocks (the Block Price Range) is computed by the Analytics Server 160 and posted on the graphic user interfaces 20 of traders with an update every 60 seconds. In this alternate embodiment the facilitator 140 generates information events that will encourage others to enter orders in the same security, without leaking the price or side of the order.

In this embodiment, there are two possible action flows when the facilitator 140 is called into action, depending on the state of the orders as known within the system's database 150.

In the first case, when a newly entered order does not find a match, the state of the system is such that there are no reasonably priced contra orders within the system. A message is delivered to all parties that subscribe to this security, indicating the presence of activity in the symbol subject of the newly entered order (if the symbol was already in an "active" state, this step is omitted). The graphic user interface 20 will display active symbols in an orange-colored box 215 above the order entry dialog 205, as illustrated in FIG. 2. The system preferably enables a second participant who sees an active symbol and has an interest in trading a large block in this security to bring up an order entry dialog by clicking on the symbol. The system preferably populates all the fields of the order entry dialog 205 in accordance with the second participant's pre-configured preferences. The second participant is acting with the knowledge that the symbol is "active." Therefore, he will understand that a first order was previously entered that caused the ACTIVE SYMBOL notification to be issued, and that this first order was priced within the BPR. Taking advantage of this information, the second participant might elect to submit a limit buy (sell) order at the block offer (block bid), to ensure a trade if the first order was on the contra side and is still open. In a preferred embodiment, once a symbol has become active it will stay so for at least 60 seconds (or other predetermined period); the open active symbol notifications are reviewed in conjunction with BPR updates and removed only if said notification has been outstanding for more than 60 seconds and there are no more reasonably-priced orders in this symbol currently open within the system at the time of a BPR update. In an alternate embodiment, the ACTIVE SYMBOL notifications are updated in real time to reflect whether or not there is a reasonably priced order within the system at this time. In another alternate embodiment, in addition to the color the GUI displays the number of reasonably priced orders that are currently open within the system.

In the second case, there is a reasonably priced contra order resident in the Book 51, but this contra order not quite aggressive enough to meet the limit price offered by the newly entered order. In this case, the facilitator module 140 will send a CONTRA PRESENT notification to the resident contra orders that qualify as being priced at least as aggressively as the current reference price. If a contra order does not presently meet this criteria but does so at a later time due to changes in the reference price, then the CONTRA PRESENT notification is sent at the later time when the condition is met. Once sent, the CONTRA PRESENT notification stays in effect as long as the order remains reasonably priced. In an alternate embodiment, there is no condition relative to the reference price and any standing contra order that meets the reasonable price condition is eligible to receive the CONTRA PRESENT notification. The graphic user interface 20 displays the CONTRA PRESENT notification by highlighting the symbol in a yellow-colored box 225 above the order entry dialog 205, as shown in FIG. 2. The first participant, who caused the symbol to be active, will therefore see that there is now a contra present. The system preferably enables said first participant to re-price the order at an aggressive price and replace the order so as to execute the second participant's order. In a preferred embodiment the system automatically proposes the aggressive end of the BPR as the default price to encourage a strategy that will result in a trade; the trader can then click to accept the proposed price limit or modify the order parameters as desired. In an alternate embodiment the system enables users to configure an aggressive order type to be limited to the better of the BPR or a configurable number of cents (or fractions thereof) from the current National Market Midpoint price, and this aggressive order type is then the one that is proposed as the default in presence of a CONTRA PRESENT notification. In a preferred embodiment the user is allowed to enter an order that will cause the system to attempt to execute the contra's order by means of clicking on the yellow box with the symbol and then pressing a single button labeled for this purpose. In an alternate embodiment the user interface 20 lets the trader select a new price and press a button marked "Replace." If none of the traders with standing orders raise their price aggression, and there are still standing contra orders after 30 seconds, if the second participant's order is then found to be priced at least as aggressively as the reference price the second participant will then in turn be eligible to learn that there are standing contra orders within the system. The system preferably displays this information by means of a yellow box, as described previously for the first participant; and said second participant may elect to increase his or her price aggression to close a trade. In another embodiment the second participant's order is only required to be "reasonably-priced" to qualify for receiving the CONTRA PRESENT notification after 30 seconds (or predetermined period). In both cases, the 30-second delay discourages a second participant from attempting to probe the system to discover whether contras are present only to later pull back; resident orders have 30 seconds to decide whether to take the counter offer or pull back. In another alternate embodiment there is no 30-second delay and all traders simultaneously receive the CONTRA PRESENT notification, but there is a 5-second minimum time in force during which orders may not be canceled. In another alternate embodiment all users receive the CONTRA PRESENT notification immediately and there is no minimum time in force condition. In an alternate embodiment traders may configure the GUI 20 to automatically replace their order with an aggressive price when a CONTRA PRESENT notification is received. In this last embodiment if there are multiple orders within the system with automatic re-pricing instructions and competing to execute the same contra order, the system executes response orders in price-time priority: standing orders compete on price first to fill the incoming contra order, then if two orders have the same aggressive price limit, on time of entry, with priority going to the first order entered.

A preferred algorithm to calculate the Block Price Range (BPR) seeks to determine reasonable prices for trading a large block order within the next 60 seconds, depending on the volatility of the stock. In the preferred embodiment, this range is based upon the prices at which trades have been reported to the consolidated tape since the last time the BPR was updated, taking a symmetric price range up and down from the current midpoint of the National best bid and offer. This range extends up and down from the midpoint by an amount that is directly related to the observed price volatility since the most recent BPR update.

| Acronym | In extenso | Description |
|---|---|---|
| ACT | Automated Confirmation and Transaction service | Nasdaq facility allowing the real time comparison of trades and forwarding of clearing information to the Depository Trust and Clearing Corporation (DTCC). |
| API | Application Programming Interface | Enables third party developers to create a front-end software application that will connect to the system and allow it to be accessed by remote users. |
| BlockLink | | System subject of a related application which enables users to facilitate block trades by sending invitations to trade to likely contra parties. |
| BPR | Block Price Range | A price range that is deemed to be reasonable for the purpose of affecting a large block trade. |
| Enum | Enumeration | Term used to denote a data type in an electronic information storage facility, wherein the possible values taken are among an enumerated list. |
| FCM | Fidelity Capital Markets | Example of a possible sponsoring broker for the system subject of the present invention. |
| FIX | Financial Information Exchange protocol | Standard protocol used in the financial markets for communicating order and trade information. |
| GUI | Graphic User interface | Front end application intended to enable access to the system subject of the present invention. |
| INT | Integer | Usually refers to a data type in an electronic information storage facility |
| IOC | Immediate Or Cancel | Attribute of an order indicating that the order should be canceled if it cannot be filled immediately. |
| IOI | Indication Of Interest | Message used in the financial markets to indicate interest in purchasing or selling a security. |
| LBQ | Large Block Quantity | A standardized order size per symbol used in the system subject of the present invention to increase the chance that orders will match. |
| LQT | Liquidity Tracker | Nasdaq facility subject of a related application referenced herein. |
| MID | Midpoint | Price that is at an equal distance from the Best Bid and the Best Offer on the National Market. |
| MPID | Market Participant ID | 4-letter acronym used to identify a broker dealer on the Nasdaq stock market. |
| NotHeld | | Attribute of an order giving the broker discretion to handle this order without the constraints of order display and handling rules pertaining to held orders. |
| OATS | Order Audit Trail System | System operated by the National Association for Securities Dealers for the purpose of market regulation. |
| OMS | Order Management System | Computer system allowing firms to keep track of the status of orders, portion that is filled or being worked, etc. |
| Peg | | Order attribute indicating that the limit price is to be calculated at the moment of a match opportunity in reference to the National Market. |
| PegOffset | | Order attribute giving the number of cents to be added to the pegged price. |
| Q/A | Quality Assurance | Part of the software development process. |
| Ticket | | Message sent from an Order Management System to a broker or trading system, to indicate an intent to trade a certain number of shares through this broker or trading system. |
| TIF | Time In Force | Attribute of an order indicating the time duration of the order's validity. |

DETAILED DESCRIPTION OF PREFERRED EMBODIMENTS

The following is a detailed description of preferred and alternate embodiments of the subject invention.

Key features. Below is a preferred list of features of the subject invention:

1. Confidential crossing of blocks. Orders are routed to a matching engine that will cross orders with price time priority and report locked-in trades for clearing. The matching engine can be remotely hosted.

2. Large Block Quantity. All orders preferably are entered in a multiple of a large block quantity configured per security. The large block size deters gaming and mitigates the "buyer's remorse" problem, or fear of being on the wrong side following a complete fill, by encouraging users to use the same order quantity.

3. ACTIVE SYMBOL notification. In an alternate embodiment, the system also notifies users when it determines that there is block interest on both sides of a security. This focuses order entry in time and thereby increases fill rates.

4. CONTRA PRESENT notification. Traders with an aggressively priced order in the system (in relation to a reference price) are notified when a nearly matching contra order is entered. 30 seconds later, the participant with the second order may also be alerted of the presence of a near match, if said second order meets the price aggression condition at that time. The CONTRA PRESENT notification rewards traders who enter aggressively-priced orders with information about passive counter offers, thereby encouraging traders to express their true price aggression.

5. FIX Connectivity to Back-office. A preferred embodiment supports mechanisms to deliver FIX executions to a Buyside Order Management System either directly or through a FIX Service bureau. This supports end of day anonymity for the buy-side client with respect to the sponsoring broker.

6. FIX Ticketing application. Clients can place shares from their Order Management System to the system (symbol, quantity and side), then work up to the placed quantity using the GUI 20. The OMS can be updated to keep track of individual working orders, or only upon a fill, depending on the client's configuration.

7. API/GUI Access. The system provides an optional trading front-end designed with input from institutional traders that prominently displays the symbols for a watch list of securities of interest that have received a CONTRA PRESENT notification. In an alternate embodiment with an ACTIVE SYMBOL notification, this is displayed as well. The system also exposes an Application Programming Interface (API) to enable approved third parties to receive such notifications on behalf of their customers and provide visibility through their own front end applications. In an alternate embodiment such notifications and the Block Price Range can also be obtained through the FIX protocol for market data services.

Figure 3A:
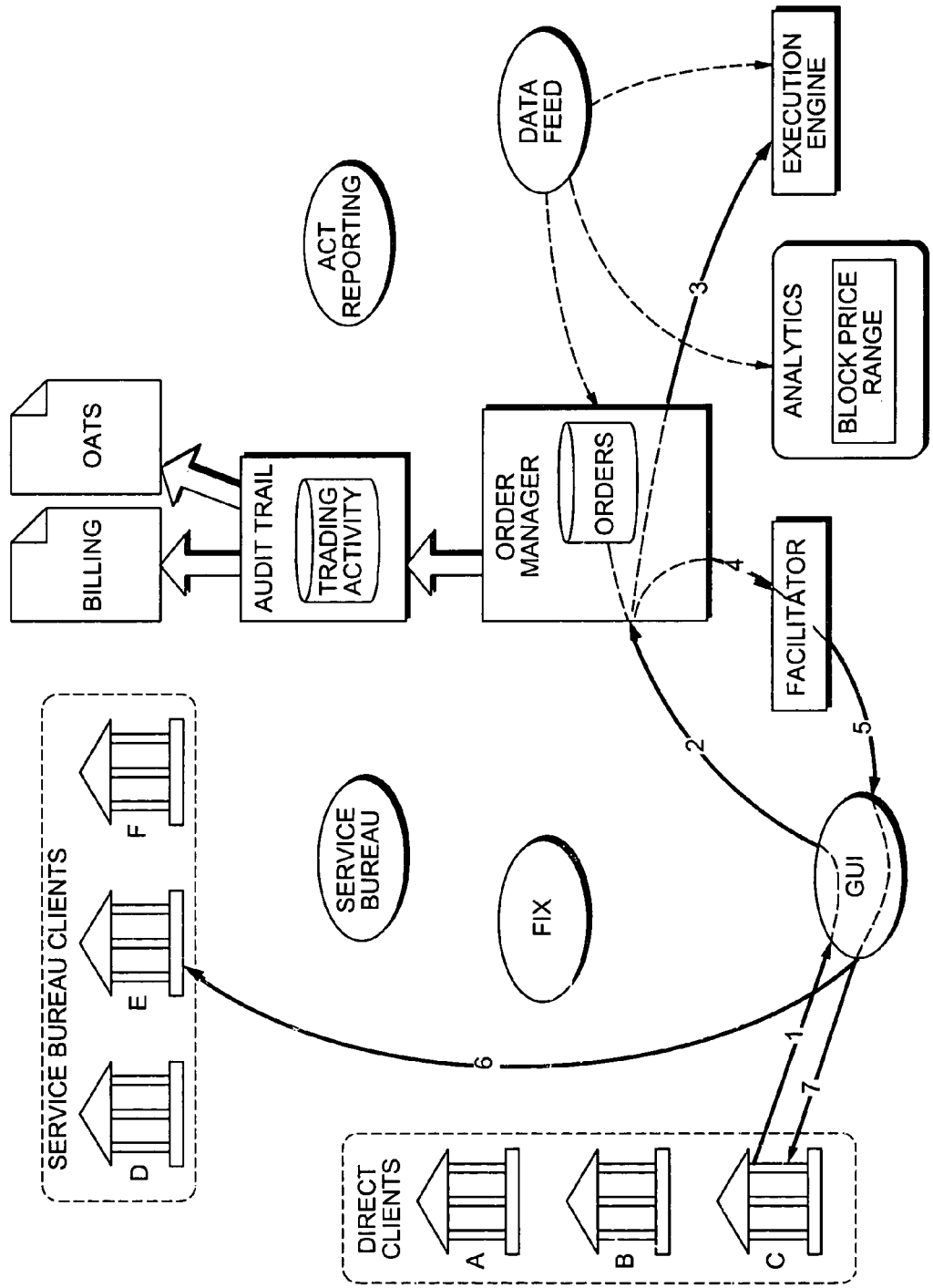
FIGS. 3(a) & 3(b) depicts operation of a preferred system and method, including interaction of the system with electronic systems of participants and related firms.
Figure 3B:
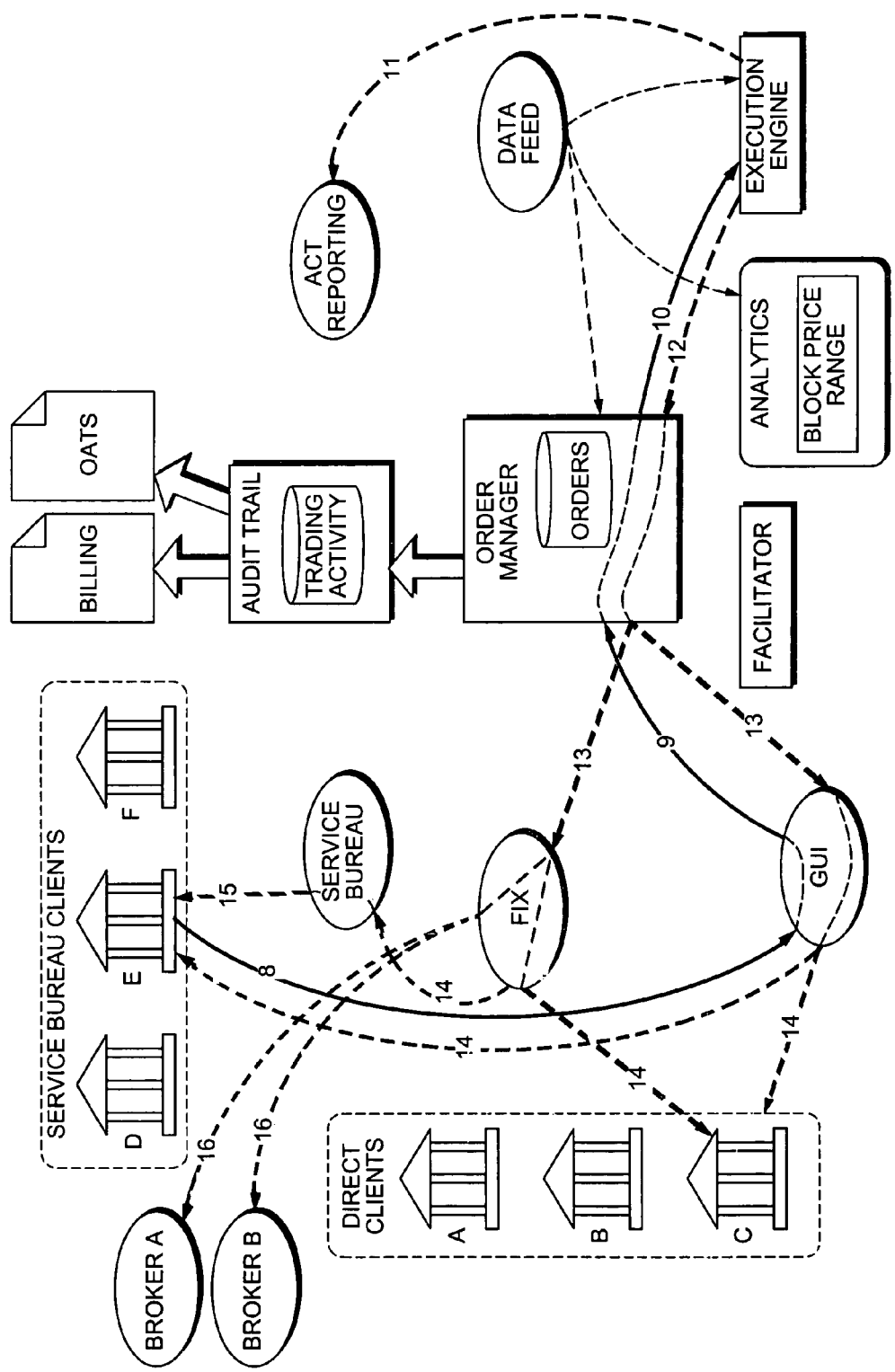

The invention comprises a preferred architecture for integrating the system with the electronic systems of participants and related firms such as the sponsoring brokers or their clearing firms. An overview of this integration is represented in FIGS. 3(a) & 3(b). These figures illustrate the flow leading to a trade between participants C and E, described below. With standing orders already in the system, a new participant enters a contra order. The system sends out the CONTRA PRESENT notification; the resident order is modified to a higher price aggression level, resulting in an executed trade.

The system preferably facilitates the trade in the above example through the following steps:

1. In step 1 a user enters an order into the system, preferably using a Graphic User Interface 20.

2. The system preferably assigns a broker of record in step 2 and validates the order against any credit limits based on the broker of record and customer ID. The order information is stored in a database 150.

3. In step 3 the Order Manager 130 routes the order to the execution engine 50, and expects an order update message back from the execution engine indicating whether the order was filled on entry, stored as a valid limit order, or canceled if the order was invalid.

4. Upon finding that the order did not execute or cancel in the execution engine, the OM 130 notifies the Facilitator Module 140 of the order entry event.

5. The Facilitator Module 140 finds that there was a contra present in the system with an aggressive price; it sends the resident contra the CONTRA PRESENT notification immediately and schedules an event to release this same message to the second participant who originated the new order after a 30-second delay, for example, if the new order is then found to be aggressive.

6. In step 6 the contra present message is delivered to the resident order.

7. Step 7 preferably occurs 30 seconds after the first contras present message was sent: the CONTRA PRESENT notification will be delivered to the new order, if the contra present situation persists and the new order is then priced aggressively compared to the reference price.

8. In step 8, the resident order, a sponsored customer using a service bureau for their FIX connectivity to the system, receives the CONTRA PRESENT notification on their GUI 200 and modifies the order to increase price aggression.

9. In step 9, the OM 130 routes the modify order request and updates the state of the order in the OM database 150.

10. In step 10 the OM 130 passes the modify order message to the execution engine 50.

11. In step 11 the execution engine 50 determines that the new price aggression is sufficient to lock in a trade and preferably reports this trade to ACT with the clearing counter-party information. In an alternate embodiment the trade is reported for tape only and the clearing information is withheld until end of day to delay the time when sponsoring brokers are notified of the trade.

12. The execution engine 50 preferably reports the execution to the Order Manager 130; OM 130 updates the state of the order in its database 150 and updates the credit consumed.
13. In step 13 the Order Manager 130 reports the trade to Net Server 110 and to FIX server 120.
14. Net Server 110 and FIX Server 120 forward the execution message to their respective clients.
15. The second client receives the FIX executions through the service bureau.
16. In the last step of the trading process a drop copy of the execution is sent to the sponsoring broker(s). In the preferred embodiment this is done at the end of day; in an alternate embodiment it is done immediately and the sponsoring brokers are directly informed of all trading activity they sponsor.

FACILITIES

The system preferably comprises the following facilities or subsystems:

1. NetServer 110. The NetServer subsystem enables clients to access the system through a Graphic User Interface 200. This is preferably the only interface that can be used to enter orders into the system. All users must either download the trading application (GUI), or develop a GUI that provides satisfactory visibility to the active symbol and contra present flags. Net Server 110 preferably supports connectivity to the trader front end via a published API.
2. FIX Server 120. The FIX Server enables users (clients) to open connections and exchange financial information messages according to the FIX protocol; source code for a FIX server is available in open source code libraries. The FIX Server is preferably is configured to receive Tickets (New, Cancel, Cancel/Replace) and order status request messages. It will push out Executions including order updates and fills. It preferably supports direct connections with client Order Management Systems, as well as connections through a service bureau. The FIX Server may also be used to deliver execution messages (with "done" status) to a sponsoring broker to set up after trade processing. Normally these messages will be issued at the end of the day, but clients preferably can also request the system to notify their broker of executions intra-day if needed.
3. Order Manager 130. The Order Manager processes orders and subsequent trading messages, passing them to the execution engine for storage and execution. It preferably receives BPR update messages from Analytics Server 160 and maintains the price aggression flag on its orders, by keeping track of when the order is priced at least as good as the BPR, or Passively priced.
4. Facilitator Module 140. Order manager 130 preferably comprises a component in charge of facilitating the entry of matching orders into the system by carefully releasing information about orders, as described herein.
5. Order Management Database 150. Order manager 130 preferably keeps track of the state of the orders in a transactional and fully recoverable Structured Query Language (SQL) database. It also contains reporting modules responsible for reporting the trades to clearing as well as for generating daily mandatory reports to the corresponding Self Regulatory Organization (SRO).
6. Analytics Server 160. Analytics Server 160 receives a data feed that informs said server of the market activity state per symbol (start, stop, trading halts), the inside best bid and offer for all Nasdaq and NYSE listed stocks (price, aggregate size and timestamp) and the last sale trade data from the National Market System consolidated tape. The server stores this information on a computer readable medium such as a hard disk drive and carries out analytical calculations as described herein to determine a reference price and Block Price Range. It is responsible for publishing to subscribing parties, per symbol, changes in the reference price, BPR update messages, and trading halts.
7. Help Desk. The system preferably comprises a Help Desk subsystem, which comprises a user interface such as a web GUI. Help desk operators can access this interface to add/remove/modify client firms, sponsoring brokers, or GUI accounts that are associated with individual traders. The help desk enables trading operations personnel to query the system based on an order ID or by firm and symbol, to trace the sequence of events that follow a client's order entry into the system and give traders who wish to call the help desk a detailed response on the history of their orders in the system.
8. Systems Operations Management. The system preferably also comprises a systems operations console subsystem enabling a system operator to manage the functional implementation of all facilities. Besides the common system operations duties, the system preferably also enables operators to carry out other duties including: security; auditing; managing batch processes for end-of-day and begin-of-day events; capacity planning; and managing the entitlements for internal accounts (operator and Help Desk).
9. Matching Engine 50. The Matching Engine 50 stores the participants' orders in an electronic matching book 51 and executes trades when buy orders and sell orders have been entered at overlapping prices, with the execution price chosen to be as close to the reference price as the two orders' price limits will permit.

Preferred implementations of the above features are described more extensively below.

Figure 4:
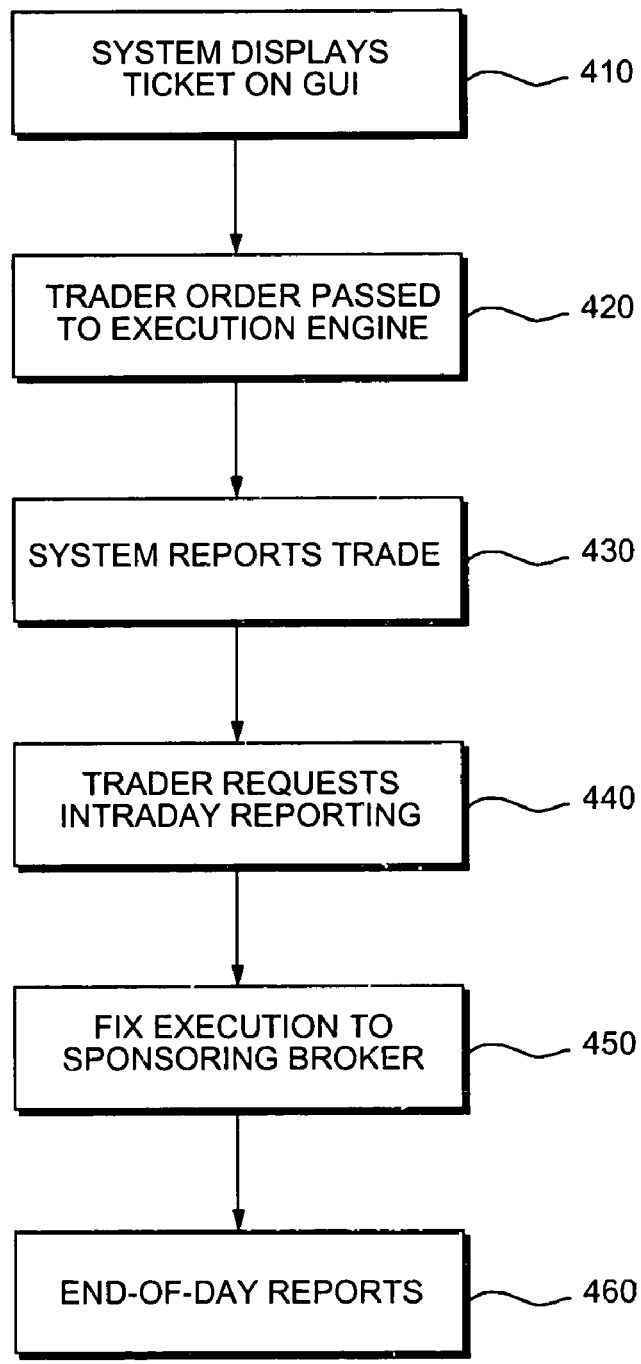
FIG. 4 shows the life cycle of a trade from the clearing perspective, in a preferred embodiment.

FIX Server. A preferred embodiment preferably uses the FIX protocol for back-office integration with the client Order Management Systems 10 and the sponsoring brokers when needed. FIG. 4 shows the life cycle of a trade from the clearing perspective. The clients are preferably able to choose between two models for using the system. The first model uses tickets to facilitate managing liability across multiple market destinations. Tickets are placements from the client's order management system that helps traders keep a tab on how many shares they are doing in each market destination (a market destination is a place where one can execute orders, such as the present system). The purpose of the ticket is to ensure that the aggregate number of shares placed across all destinations will never exceed the total number of shares of the client's overall order, as known to the client's Order Management System 10. When a trader uses tickets, the tickets that have been entered from the OMS appear on the GUI 20 and orders can only be entered against these tickets.

The client that elects to use tickets preferably will only be able to enter an order into the system if said order is in the same security, on the same side, and of a size not greater than a previously entered ticket. The system preferably updates back-office and third-party systems by performing the following steps when traders elect to use tickets.

1. In step 410 a ticket is entered into the system 100 as a FIX Order with no price. The ticket carries a terminal ID that the system maps to a particular GUI. The trader sees the ticket show up on his/her GUI.

2. In step 420 a trader enters an order against this ticket, which we will refer to herein as a "child" order. This child order is in the same security and side as the ticket, and for a quantity that is chosen to be the lesser of a trader-configured default order quantity or the ticket quantity. The system preferably validates the order and passes it to Execution Engine 50. In the preferred embodiment the order entry events are reported to the OMS via FIX Execution messages with Order Status=New. In an alternate embodiment the client OMS will only receive Execution messages when the trade is completed (see below).
3. When a trade occurs against this order, Execution Engine 50 preferably reports to ACT for tape and clearing (step 430); then notifies Order Manager 130 of the trade. In the preferred embodiment the system then notifies both API clients such as the GUI and FIX clients such as customer Order Management Systems of the trade details.
4. In step 450 the system preferably sends a FIX Execution message to the executing broker, including the Client-ID.
5. The system preferably enables a user to initiate the allocation process at or before the end of the trading day (step 440 is executed at user's option).
6. The preferred system carries out the following (step 460) at the end of day.
   a. A trade summary file is sent to the sponsoring broker's clearing firm. This contains the information pertinent to clearing, including the symbol, shares bought or sold, and contra party's MPID.
   b. OATS reports give a summary of the order trail and executions on behalf of the sponsoring broker. The system automatically sends the OATS reports to the sponsoring broker(s) for forwarding to the NASD. In an alternate embodiment it sends the report directly to the NASD. These file transfers are electronic and utilize the File Transfer Protocol (FTP).

In the preferred embodiment users are enabled to select an alternate configuration that does not require the use of tickets, but instead allows traders to start the process at the order entry step 420. The remaining flow is the same as described above.

In an alternate embodiment, the system 100 is hosted by the sponsoring broker for all clients that use the system and comprises after-trade-processing subsystems, as can be easily implemented by those skilled in the art or are commercially available through specialized vendors. In this alternate embodiment there is no need for end of day anonymity and the broker execution reports can be dispatched immediately.

The FIX Server 120 preferably supports a variety of networking solutions to provide connectivity to client Order Management Systems 10. For example the client's OMS can connect directly to said FIX Server; or it can communicate with FIX Server 120 through a FIX Service Bureau that mediates connections between FIX Server 120 and a plurality of clients.

The FIX Server 120 preferably rejects tickets when they are invalid or when the client is configured not to use tickets; the ticket reject message preferably carries an intelligible reject reason in the text field. If the rejection is sent because the order quantity was less than the Large Block Quantity for this security, the correct LBQ is preferably given for information in the message text in the reject message. In the preferred embodiment the FIX Server 120 preferably supports the following incoming messages: FIX New Order, Cancel Order, Cancel/Replace, and Order Status Requests. Outbound messages preferably include Order Updates relating to child orders of a given ticket (a FIX Execution message carrying the Order-ID of the underlying ticket), if the client uses tickets. Clients that do not use tickets preferably receive fills only (FIX Execution messages). In an alternate embodiment, clients that do not utilize tickets receive Order Update messages for each event relevant to an order entered via the GUI, including New Order acknowledge messages, so that the OMS can keep track event-by-event of the total size being worked, as well as the size that has been filled.

FIX Server 120 preferably supports a web configuration screen that enables an operator to set up and customize new client connections without requiring changes to the system software. As mentioned above, FIX buy-side clients can preferably be configured for either (a) FIX Executions only, or (b) to support ticketing and execution reporting. FIX Sponsoring Broker clients will preferably be configured to receive executions only. In an alternate embodiment it is possible to configure a sponsoring broker's FIX connection to receive a drop copy of every message sent to the sponsored client's OMS. In addition to the execution message sent on each fill, the configuration options preferably include an option to send a final FIX Execution message when an order is complete, with Order Status field set to "done", to indicate that the work on this order is complete.

Order Manager. Order Manager 130 operates as a message processor. In the following paragraphs the processing of various messages is described.

The system preferably enables users to enter New Ticket messages. A New Ticket message is a FIX New Order message with Order Type=Market and no limit price. FIX Orders with a limit price will be rejected. In an alternate embodiment this message may be submitted over the system's Application Programming Interface (API).

Figure 5:
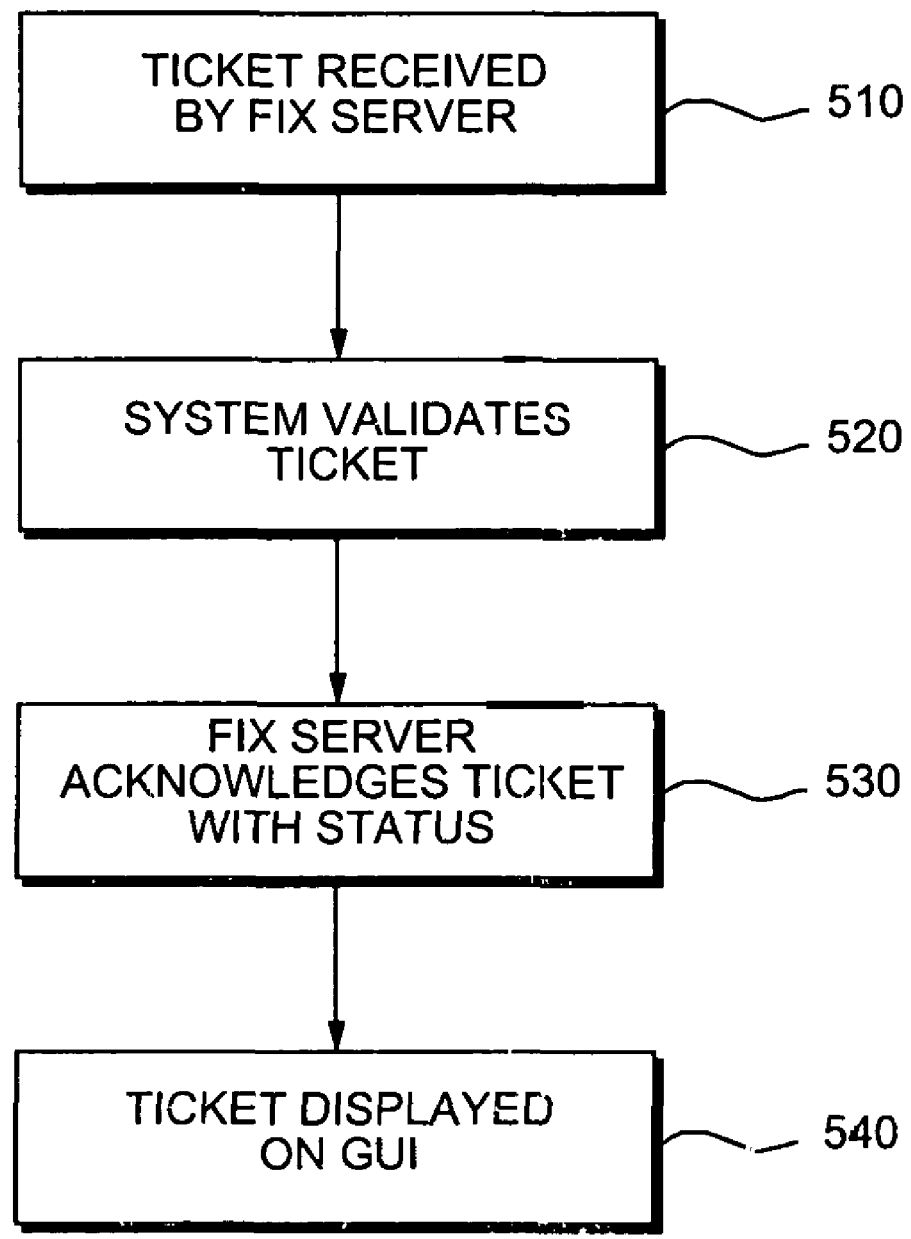
FIG. 5 depicts steps preferably executed while processing a New Ticket.

The following steps are preferably executed while processing a New Ticket (see FIG. 5), after the ticket is received at step 510:

Validation. At step 520, the system preferably processes new orders by first validating the fields in the FIX New Order message. A ticket must have a valid client-ID, a trader-ID (that maps to a unique GUI), security and side (Buy or Sell) and be at least as large as the block quantity for this security. Cloud9 preferably accepts FIX Orders (tickets) identified as "Market" orders and "Not Held", and rejects tickets that have a limit price. In alternate embodiments the restrictions on price and Not Held status are not enforced. A client preferably is only permitted to have one ticket per security on each side; a second buy ticket or a second sell ticket in the same security will be rejected if the prior ticket still had leaves. If the prior ticket was filled or canceled, then you can enter a second ticket; it will replace the first on the GUI front end. An alternate embodiment employs a front end that enables the display of multiple tickets per security and the client is permitted to place any number of tickets. Other business FIX order attributes will be disregarded. Rejected tickets are preferably displayed on the GUI with a reason code.

Processing. The system preferably stores valid tickets in its database 150. The ticket is then displayed on the client GUI via NetServer 110 at step 540, 10 and acknowledged back to the client OMS via FIX Server 120 at step 530. The table below gives required fields in the Ticket message in the preferred embodiment.

| Field | Description |
| --- | --- |
| ClientID | The firm that enters the ticket |
| ClientTicketID | Unique to this firm |
| TraderID | The GUI that will see the ticket |
| Quantity | Number of shares |
| Side | Buy or Sell only |
| Price | Must be left blank |
| Symbol | Supported within the system |
| Type | Must be Market |
| NotHeldFlag | Must be set |

The system preferably enables users to enter Cancel/Replace Ticket messages. A Cancel/Replace Ticket is preferably submitted as a FIX Cancel/Replace Order with the ClientTicketID of a prior open Ticket and the ClientTicketID of the new ticket. In an alternate embodiment this message may be submitted over an API. In the preferred embodiment, the system carries out the following steps upon receiving a Cancel/Replace Ticket message.

Validation. The system subject of the present invention preferably rejects the Cancel/Replace message if the new quantity minus already-filled quantity (new "Leaves") is less than the system Large Block Quantity for the symbol, or if it is less than the total amount of shares placed on the execution engine as open orders (leaves less than working).

Processing. If it accepts the request, Cloud9 preferably modifies the ticket size to be applied to any subsequent order entry events and pushes the change to the client GUI via NetServer 110. It preferably also acknowledges the change back to the client's OMS via FIX.

Figure 6:
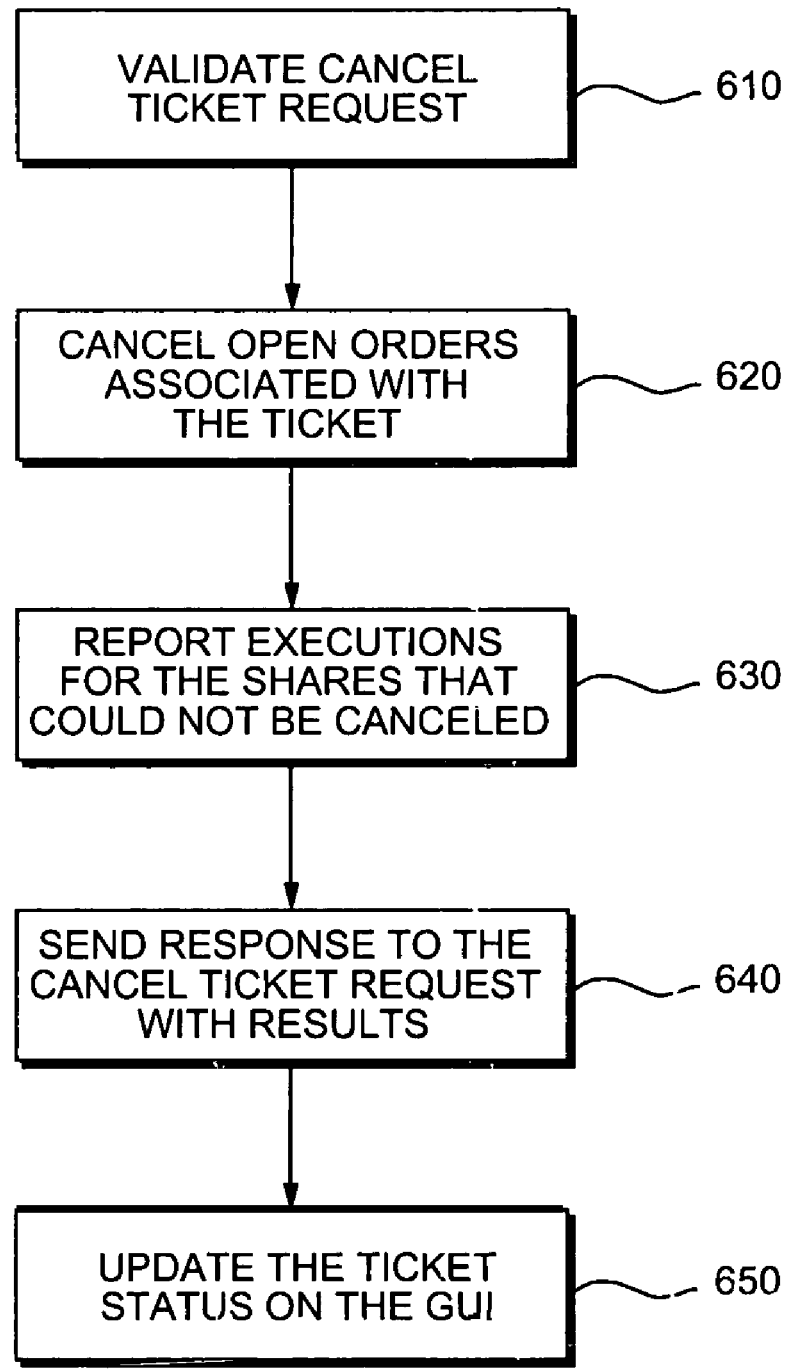
FIG. 6 depicts preferred steps for processes a Cancel Ticket message.

The system preferably enables users to enter Cancel Ticket requests. A Cancel Ticket message is a FIX Cancel Order message with the ClientTicketID of a prior open Ticket. In an alternate embodiment this message may be submitted over an API. The system subject of the present invention processes the Cancel Ticket message as follows (see FIG. 6).

Validation. The system preferably validates the fields of the Cancel Request message in step 610 by ensuring that it points to an open Ticket.

Processing. If there are open orders, in step 620 the system will first try to cancel all open orders associated with the ticket, then report any executions 630 that were done prior to the cancel with messages in flight (this "cleanup" process ends when all related orders are either filled or canceled and the Cloud9 Order Manager's database agrees with the Execution Engine's database on the status of any fills). When any open orders have been cleaned up, in step 640 the system will acknowledge the Cancel Ticket with the results indicating the size that was canceled, if any. A successful Cancel Ticket request will be notified to the Client GUI via NetServer in step 650.

The system preferably enables users to enter New Order messages. A New Order message is preferably submitted through the GUI or API and comprises a request to buy or sell a given number of large block lots of a given security at a limit price or better. In the preferred embodiment the user may also select a pegged price limit, in which case the order will be limited at the less aggressive price between the absolute limit price and the pegged limit price. In an alternate embodiment users may elect to enter New Orders via FIX, using the FIX ExecInstr field to distinguish tickets (FIX order with ExecInstr="suspended") from new orders (which are not suspended), or elect not to use tickets at all and have all their FIX orders be interpreted as New Order messages. New Order messages are preferably handled as follows.

Validation. The system preferably validates that orders are for a multiple of the large block quantity in a supported security. In an alternate embodiment the order can be for any quantity. Another step in the preferred order validation process is to verify that the order contains a price field. In an alternate embodiment this requirement is waived if the user has selected a pegged price, in which case a pegged order may float without limit. The Peg types supported in the preferred embodiment are pegging to the NBBO Midpoint, or no pegging at all. Alternate embodiments support additional pegging attributes, as are known to those skilled in the art. The system preferably also validates that the side of the order is Buy or Sell. An alternate embodiment also supports short sell orders. The parameter PegOffset determines the number of cents (or fractions thereof) from the pegged value (NBBO Midpoint) where the order should be priced. The PegOffset attribute is preferably disregarded if the order is not pegged. The system preferably reports rejected orders to the GUI Client with a comprehensible error code. If the client uses ticketing, the validation step also preferably checks that the order does not exceed the size of the associated ticket and is on the same side as the ticket. If the client entering the order has a credit limit with a sponsoring broker, the system preferably verifies as part of the validation process that the order does not violate said credit limit; the credit verification process will be described in greater detail below. In a preferred embodiment an order is rejected if the system had previously received an order within the last 5 seconds (or other predetermined period), in the same security and side with a price that was both more passive than the present order, and more passive than the reference price at that time. In an alternate embodiment such increased aggression orders are accepted but marked as non-executable until the 5-second delay expires. In another alternate embodiment all orders are non-executable until an accumulation period expires, but are then submitted into the Execution Engine 50 in order of side, price and time of entry. In yet another alternate embodiment there are no such conditions and orders can be entered at any time with any price and are immediately executable, but Help Desk operators are notified when a particular user is found to have a pattern of checking various price levels to try to feel out resident orders' price limits, and call the customer to notify that such behavior is not permitted. Help Desk operators in this embodiment are given specific criteria that would cause them to suspend a customer's entitlement to trade on the system if the behavior is not corrected.

In the preferred embodiment IOC orders are rejected as invalid. In an alternate embodiment IOC orders are accepted but the owner of a standing contra order that is qualified to see the CONTRA PRESENT notification can see that a contra placed an IOC order that failed to execute (in the preferred GUI, the symbol changes from orange to yellow briefly then reverts back to orange). In yet another alternate embodiment the IOC orders are accepted but the CONTRA PRESENT notification is not sent.

Order attributes. The system of the preferred embodiment expects to find the required fields in the New Order message as given in the following table.

| Field | Comments |
| --- | --- |
| ClientID | Firm that entered the order |
| TraderID | GUI that entered the order |
| ClientOrderID | Unique to this firm |
| Quantity | Shares |
| Price | Optional if pegged. Pegged orders with a limit act as limit orders if the peg value crosses the limit. |
| Side | Buy or Sell only |
| Symbol | On the Primary Market |
| Time-in-Force (TIF) | TIF is either an absolute time or DAY. All orders expire at the end of the trading day. |
| Peg | MID, NONE. Will execute at the pegged value or better. |
| PegOffset | Signed dollar amount to be added to pegged price |

Figure 7:
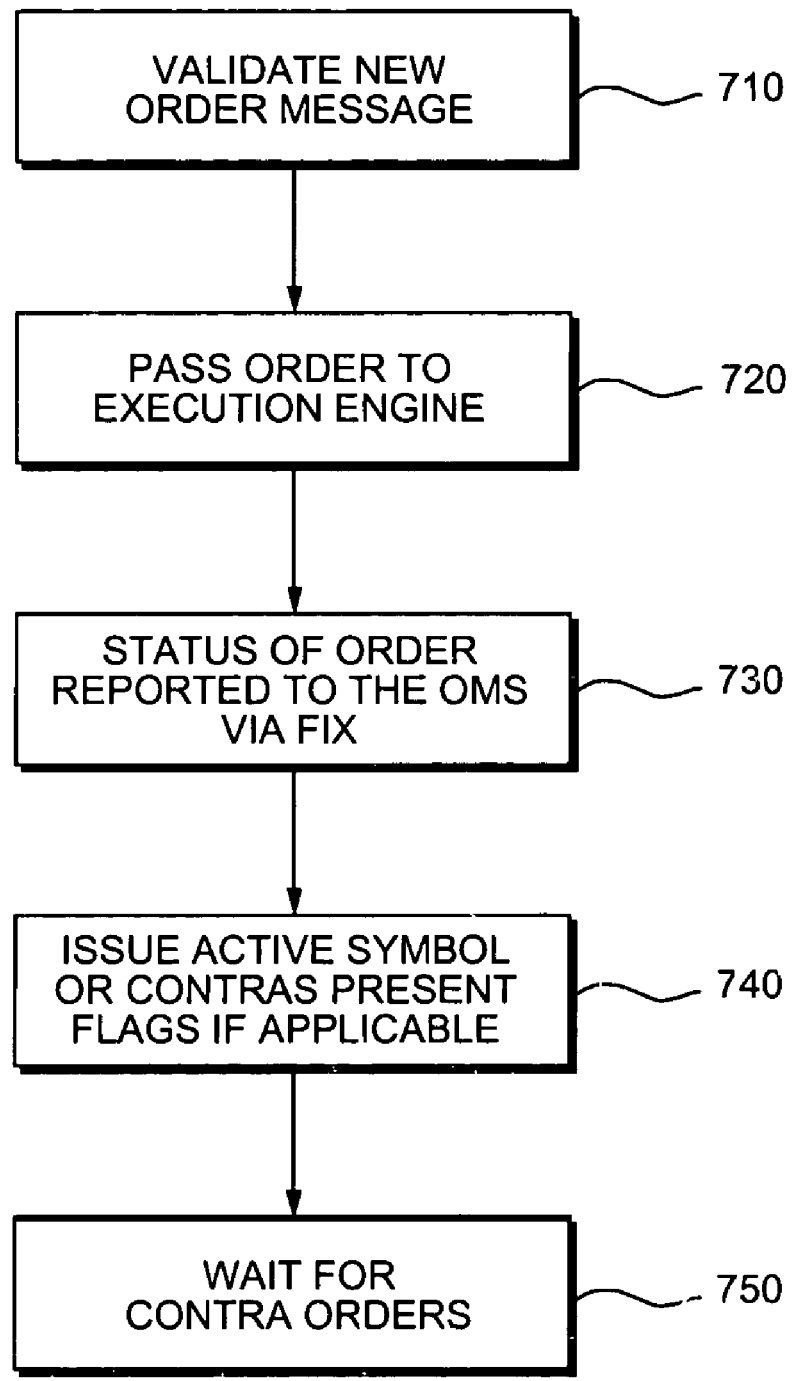
FIG. 7 depicts preferred steps for processing valid orders.

Processing. The system preferably processes valid orders through the following steps (see FIG. 7).

After validation (step 710), valid orders are passed to the execution engine immediately in step 720. The response will indicate whether the order was Rejected, or accepted and placed in the book as an open order, or has an execution pending. The status from the execution engine is reported to the GUI client via NetServer.

If the client uses FIX Tickets, the system preferably reports the order status back via FIX as Accepted or Rejected (step 730); the execution pending status will be reported as Open status in FIX (a subsequent locked-in execution message will follow). The FIX order status update message carries the ID) of the associated ticket.

If the Execution Engine indicates that the order is Open, the system will initiate a process 740 through the facilitator with the aim of increasing the likelihood of a trade.

A preferred embodiment determines whether there are aggressive contra orders in the system. An order is an aggressive contra order if it is on the contra side and priced at least as aggressively as the symbol's current reference price. Users with an aggressive contra order immediately receive a CONTRA PRESENT notification. Users with contra orders that do not qualify as being aggressive at present are eligible to receive such a notification as soon as they later become aggressive through a change in the reference price. An event is preferably scheduled at the time of order entry plus 30 seconds (or other predetermined period) to send a CONTRA PRESENT notification to the newly entered order if the order is then found to be aggressive. This preferably occurs regardless of whether or not resident contra orders were eligible to receive the notification. Thus, users who place passive orders in the system may have the presence of such orders discovered by one who is willing to place an aggressive order for a duration of 30 seconds or more. In an alternate embodiment the delayed CONTRA PRESENT notification is only sent if resident contras had been found eligible to receive such notifications first.

In an alternate embodiment, the system also determines on order entry whether the new order's price is at least as aggressive as the latest published value of the Block Price Range (BPR), and if so, tags the order as "reasonably priced". If the order was identified as being "reasonably priced" and the symbol was not already in an "active" state, the system issues an ACTIVE SYMBOL notification to all users, inviting them to place orders in this security. In an alternate embodiment that also calculates a Block Price Range, the CONTRA PRESENT notification is sent only if the new order's price is reasonably priced, and is removed if it is later determined that either order is no longer reasonably priced, through changes in the orders' prices and the BPR.

In step 750 the system waits for other orders to arrive; a contra order is processed as above starting at validation step 710. Contra orders with an equal or better price preferably execute as close to the then current reference price as possible.

The system preferably enables users to enter Cancel Order messages. Cancel Order is a GUI/API message with a ClientOrderID corresponding to a prior New/Replaced Order. In an alternate embodiment cancel order requests may also be received via FIX.

Validation. If the order ID is invalid or points to an order that is not known within Cloud9 as being Open, the cancel order request is rejected.

Processing. The system 100 preferably processes Cancel Order requests through the following steps.

Cloud9 OM 130 passes valid cancel order requests to the execution engine 50.

The Execution Engine 50 will respond with the shares that were canceled. The cancel response may be preceded by an execution(s). For filled or expired orders the cancel request is rejected.

Upon receipt of the successful cancel response from the execution engine 50,

The order status update is pushed to the GUI Client 20 and the Analytics Server 160.

If the client uses FIX Tickets, also report the status update via FIX.

Release credit that was allocated to this order.

If a "CONTRA PRESENT" notification had been issued related to this order, remove the notification if there is no longer a contra present.

Note: in an alternate embodiment with an ACTIVE SYMBOL notification, a cancel order preferably does not remove this notification. Users may continue to place orders on both sides in response to the notification, leading to trade opportunities. In another alternate embodiment the ACTIVE SYMBOL state is directly linked to the presence of a reasonably priced order in the system.

The system also enables the user to enter cancel/replace order requests to modify a previously entered order. In the preferred embodiment the Cancel/Replace Order is a GUI/API message pointing (ClientOrderID) to a valid prior New/Replaced Order. In an alternate embodiment this message can also be entered via FIX, with the same configuration options as described previously for the New Order message.

Validation. The ClientOrderID should point to a valid order. The system preferably rejects a cancel/replace request if it points to an order that is already known to be canceled, expired or filled, or if it increases the price aggression on a previously passive order prior to the expiration of a minimum delay (say, 5 seconds); alternate embodiments of this function are described above for the New Order message. The system preferably supports pre-trade credit checking. Therefore, if the size of the order is to be increased through the cancel/replace request, the system first verifies that the new size would not exceed the credit limit on the user's account. Replace order requests that fail credit validation are rejected as invalid with a reason code explaining the credit reason.

Cancel/Replace Order processing. Cloud9 OM 130 preferably processes cancel/replace order messages by passing them through to the execution engine. The execution engine 50 will respond with the order status including filled shares, remaining open shares, and average price.

Trade Message. The status update will be pushed to the GUI Client via NetServer 110.

If the client uses FIX Tickets, also report the status update via FIX.

If the cancel/replace modifies the size of the order, cancel and replace credit amount allocated to this order to reflect the new order.

Trade Message. The execution engine 50 reports trades to the Order Manager 130 via a Trade Message. Each Trade Message from the Execution Engine reports a locked-in trade involving exactly two orders.

The Execution Engine 50 will match individual orders against a book of contra orders (one-to-many match). There can be multiple individual trades following a match check, each of which will be processed independently.

Since a trade is a single transaction, both legs of the trade should be reported as a unit.

The preferred embodiment of the system expects to find the following fields in a Trade Message.

| | Description | Type |
|---|---|---|
| TradeID | Id for this trade | String |
| NewOrderID | The "One" in a One-to-many match | String |
| ResidentOrderID | The contra order | String |
| Quantity | Shares | INT |
| NewAvgPrice | Average share price across all fills of the order. | FLOAT |
| NewFilled | Number of shares filled. | INT |
| ResidenAvgPrice | Average share price across all fills of the order. | FLOAT |
| ResidenFilled | Number of shares filled. | INT |
| Price | As reported to ACT | FLOAT |
| ACTTradeID | As reported to ACT | String |
| TimeStamp | As reported to ACT | HHMMSSCC |
| BidTimeStamp | Most recent quote received on the Bid side (whether or not it caused a price change) | HHMMSSCC |
| OfferTimeStamp | Most recent quote received on the Offer side (whether or not it caused a price change) | HHMMSSCC |

Processing a trade message. The system 100 preferably processes Trade Messages from the Execution Engine 50 through the following steps.

Report both fills to the relevant GUI clients and via FIX for clients that use Tickets or request FIX executions.

Update credit to reflect the actual amount of credit consumed based upon the price of the trade.

If the trader uses tickets and the residual quantity on the ticket is less than the Large Block Quantity for this symbol, expire the remaining quantity on the ticket.

Send Block Tape Message to Net Server for delivery to GUIs that watch this security. The block tape message preferably contains the following fields.

| | Description | Type |
|---|---|---|
| TimeStamp | Reported by the Execution Engine | HHMMSSCC |

| | Description | Type |
|---|---|---|
| Quantity | Shares | INT |
| Price | | FLOAT |
| TotalQuantity | Traded in this security since start of day | INT |

The system preferably enables traders to cancel all orders they have previously placed into the system with a single request, in the event of an emergency. CancelAllClientOrders is a message from Net Server requesting cancellation of all orders that have been entered by a given GUI. In an alternate embodiment this message can also be delivered via FIX. Since the execution engine 50 does not know the customer ID, Cloud9 OM will process the cancel-all message by individually canceling every order associated with this client that has an Open Status, processing these as individual Cancel Order requests.

In embodiments that comprise a Block Price Range, Order Manager 130 subscribes to BPR Update Messages from the Analytics Server 160 in securities for which it has an open order and updates the reasonably priced condition on receipt of BPR update messages. If there is a change in the reasonable price status of an order, Order Manager 130 re-evaluates whether there is a contras present situation for all orders in this security and updates contra present notifications as described previously. If this results in a change in the Contras Present Status on an order, the system preferably sends a CONTRA PRESENT notification update to affected GUI clients. In embodiments with an ACTIVE SYMBOL notification, the system also updates these notifications based on BPR update messages. If the symbol is in an active state, has been in this state for at least 60 seconds (or other predetermined period), and there are no longer any orders within the BPR, the symbol is set to a "not firm" state and NetServer sends an ACTIVE SYMBOL notification update message with SymbolStatus=Not active. In an alternate embodiment the active symbol status is updated on any BPR update message and may be set to a not active state even if the symbol has been firm for less than 60 seconds. In yet another alternate embodiment the active status is updated on every change to the National Market Best Bid and Offer prices and every order entry or cancellation event to ensure that the active status always reflects the presence of a live, reasonably-priced executable order in the system at this time.

Execution Engine. The execution engine 50 in the preferred embodiment is hosted in the same facility as the Cloud9 system 100 and the two systems communicate over an intranet. In an alternate embodiment the Execution Engine 50 is a component within the Cloud9 system 100; in both embodiments the functionality of the Execution Engine 50 is as described below. The Execution Engine 50 receives "anonymized" orders, meaning that the order is stripped of the buy-side customer ID, and identified instead by an internal Order-ID and the sponsoring Broker-ID. The Execution Engine 50 processes new incoming orders by checking to see if there are resident orders that match with the incoming order and executing trades with resident orders ranked using price time priority, as we describe in more detail below.

The Execution Engine 50 in the preferred embodiment is the book of record for recovering the true status about any Cloud9 trades in the event of a failure.

The preferred embodiment of the Execution Engine 50 supports Limit orders and orders pegged to the NBBO Midpoint. In an alternate embodiment other order types known to those skilled in the art are also supported. For example an alternate execution engine may support price discretion orders that automatically increase their price aggression to keep a top position in price time priority ranking when other orders are placed in the system. Such orders preferably are then re-priced to one tick better than the best other order on the same symbol and side, as long as this does not violate the absolute limit price of the discretion order. In another example of an alternate embodiment, the system enables traders to enter orders that are to be priced at a later time based on a volume-weighted average price (VWAP) for a forward time interval, such as the VWAP from the time of the trade until end of day, or the VWAP over a specified time interval, such as a half hour interval. For example, such an order can be priced to buy up to two cents above the VWAP for the 11:00-12:00 future time interval. In this embodiment, the ACTIVE SYMBOL notification for future-priced orders displays the time interval during which the order will be priced, and all orders responding to such a notification must necessarily be priced in relation to the same future average price. Thus, the VWAP time interval effectively forms part of the definition of the fungible item that is being traded. Similarly, an alternate embodiment enables users to place orders in a pair of securities, or a basket comprising multiple securities. The ACTIVE SYMBOL notification describes the composition of a trade unit, and traders are expected to respond with buy or sell orders in the same trading unit. In these alternate embodiments the reference price and Block Price Range must be extended to VWAP orders or baskets. For VWAP orders the reference price is the VWAP itself, while for pairs and baskets the reference is the average of the prices of the instruments in the pair or basket, weighted by the dollar value of each item based on its individual reference price.

All orders are either limit orders or orders priced relative to a reference price (pegged orders). If a pegged order also has a limit price then the order is preferably considered to be priced at the more passive of the limit value or the pegged value. In embodiments with future priced orders such as VWAP orders, an absolute limit price is preferably not allowed. Once a trade is locked in, it will clear at whatever the future price turns out to be. In an alternate embodiment with future-priced VWAP orders a user may announce a stop price on the VWAP order. If this price level is breached before the expiration of the pricing period then the period ends prematurely and the trade is locked-in only for the corresponding portion of the shares, at the VWAP up to this point. For example an order for 100,000 shares to buy at the future VWAP over the next hour with a stop price of $21.15 (for example, the current price may be $21.01) will close if the market price breaches $21.15 45 minutes into the hour. Since ¾ of the time has elapsed the trade would be locked-in for 75,000 shares at the VWAP over the 45-minute interval. Such a stop price protects the buyer from the risk of fast price swings during the pricing interval, and lets the seller enjoy the stronger market price to place the remaining shares.

The execution engine 50 preferably allows pegged orders and limit orders to interact. Pegged orders are priced on the occasion of a match check event and are then treated same as a limit order at the more passive of the limit price or the pegged price. In a preferred embodiment the pegged value is the NBBO Midpoint as reference price, plus a Peg Offset amount, which can be positive or negative.

Users in the preferred embodiment are enabled to use a Peg as a protection on a limit order to ensure that if the market moves swiftly, their order does not trade at a price that suddenly appears very aggressive as compared to the NBBO. The GUI 20 suggests this way of using a Peg by representing the feature as "Price protection" and offering the option to "not trade more than <n> cents from the NBBO midpoint price."

Because there are both pegged orders and limit orders in the system, a match may also be triggered not on order entry, but as a result of a change in the NBBO prices that would cause a pegged order's price to cross a contra order's limit price.

Therefore, in the preferred embodiment of the present invention, a match can be triggered either on entry of a new order, or on a change in the NBBO prices that causes a pegged order to cross with other orders. The system preferably implements the following process to identify such matches.

The Execution Engine 50 preferably comprises a component that receives all quote update messages from the data provider 60 and keeps track of the current best bid and best offer, using information caching techniques that are known in the art. It preferably also enables a component of the Execution Engine 50 to subscribe to price updates for a given security, whereafter it will receive a message whenever there is a change in either the best bid or the best offer in the given security.

The Execution Engine 50 preferably maintains a list of symbols for which it has one or more Limit Orders on one side and one or more Pegged orders on the other side and subscribes to NBBO price changes for all securities in this list. For the purposes of this section, pegged orders with a limit price are considered to be pegged orders if their price was taken to be the pegged value when received by the Execution Engine 50, and as limit orders if they were priced as limit orders on entry (i.e., the pegged value was more passive than the limit price). For each symbol within this list, Execution Engine 50 preferably will set a buyer threshold defined as the value of the reference price at which the value of the pegged order would equal the best limit contra order, and/or a seller threshold defined similarly for pegged sell orders to intersect limit buy orders. On each NBBO price change, the system preferably calculates the new reference price and determines whether this price breaches either the buyer threshold or the seller threshold. If the buyer threshold is breached, the system proceeds to execute the trade between the pegged buy order and limit contra orders ranked in price time priority, as if the buy order had just been entered into the system, and vice versa for a sell order when the seller threshold is breached.

If multiple pegged orders are eligible to match against sell orders, they are preferably ranked by price time priority based on the effective price at that time so if two orders are pegged at the NBBO Midpoint with different absolute limit prices, the limit prices are irrelevant as the two orders have the same effective price, and their ranking is determined by time of entry, with the oldest order at the highest priority level.

The Execution Engine 50 will preferably observe trading halts on the primary market as follows. While a security is halted, all existing and new orders will be declined. The Execution Engine 50 derives the security-trading status from a Data Vendor 60. If the Data Vendor 60 is unable to provide the service or the corresponding communications network 70 fails, the Execution Engine does not process any trades but simply waits for the vital services to be re-established.

The market data feed in the preferred embodiment contains the market halt information as well as level 1 and last sale data for purposes of the Analytics Server 160.

If a New Order triggered the match, the Execution Engine preferably reports the execution pending immediately to Cloud9 OM 130 with the expected total match quantity. This report is informational only for use by the Facilitator 140 and does not guarantee that the trade will clear, as described below.

A trade is preferably processed as a single transaction, using software-programming methods that are known in the art, to avoid the risk of the system reporting one side of the trade and not the other in the event of a computer failure. Processing a trade preferably involves the following steps.
1. Report the trade to the regulatory organization as required and update the order status in the database. In the preferred embodiment the trade is reported to the Nasdaq ACT system. The matching engine reports to ACT immediately for data dissemination (tape reporting) and for clearing purposes.
2. When the trade is successfully locked in for clearing (ACT acknowledges trade reports and assigns an ACT report ID), the Execution Engine 50 preferably sends a firm trade report message to the Order Manager 130. Trades involving pegged orders are preferably reported with the timestamp of the most recent bid and the timestamp of the most recent offer that were used to calculate the NBBO midpoint, as well as the timestamp at which the execution was processed.

The Execution Engine 50 processes incoming messages as follows:

New Order Processing. New Order is a message from the OM 130. It is preferably processed as follows.
Identify matching orders, if any, and acknowledge order entry with status to the Order Manager 130.
If the order is not filled but causes a situation where there are limit orders on one side and pegged orders on the other, register for NBBO price updates in the security.
Process any trade as described above.
Cancel Order. Cancel Order is a request from Cloud9 OM to cancel an open order. It is preferably processed as follows.
Verify if the Cancel Order request carries a valid order ID that points to an order in the Book 51.
If the order has already been traded, reject the cancel order request message
It the order is not yet traded:
Mark the order status as canceled in the Execution Engine database (Book 51).
Report the successful cancel status to the Order Manager 130.

In the preferred embodiment an order can be modified or canceled at any time, except to increase the price aggression of a passive order as described above. In an alternate embodiment the orders are required to have a minimum time in force of 10 seconds to give other participants a reasonable time to react to events triggered by the Facilitator 140, such as the Active Symbol or Contra present notifications.

The system preferably also enables the Order Manager 130 to request cancellation of all orders associated with a given sponsoring broker, or all orders altogether. The Execution Engine 50 processes such aggregate cancel order requests by first identifying all affected orders and then processing the cancel order requests by time of entry of the orders.

The Execution Engine 50 preferably validates connectivity with the Order Manager 130 using 30-second heartbeats. On loss of connection, the system preferably cancels all orders.

NetServer. The system preferably comprises an Application Programming Interface that enables a client GUI 20 to connect to the NetServer 110 through a communications network 80 such as the Internet. NetServer 110 allows customer front-end applications to access Cloud9 trading services such as the viewing of BPR updates and entry of orders in to the system.

If loss of connectivity to a client is detected, Cloud9 preferably attempts to cancel all the client's orders with the Execution Engine 50. In an alternate embodiment the system allows clients to select a configuration wherein the loss of connectivity does not cause cancellation of open orders; clients that elect this alternate configuration then have to call the Help Desk to cancel orders in case of an emergency.

NetServer 110 passes trading activity messages (orders, cancel/replace, cancels) to the order manager and passes responses and unsolicited messages back to the client. It also stores client GUI configurations, such as the location and size of windows on the screen and the list of securities that the trader wishes to watch. These examples do not constitute an exhaustive list but instead are intended for the purpose of illustration only; other configuration parameters are stored to support normal GUI display options as can easily be apprehended by those skilled in the art.

In a preferred embodiment, the GUI enables traders to view credit alerts generated by the system when the amount of available credit falls below the dollar amount typically required to execute a large block trade. In an alternate embodiment credit alerts are not displayed and the user simply discovers the absence of sufficient credit upon the failure of an order entry request.

Figure 1:
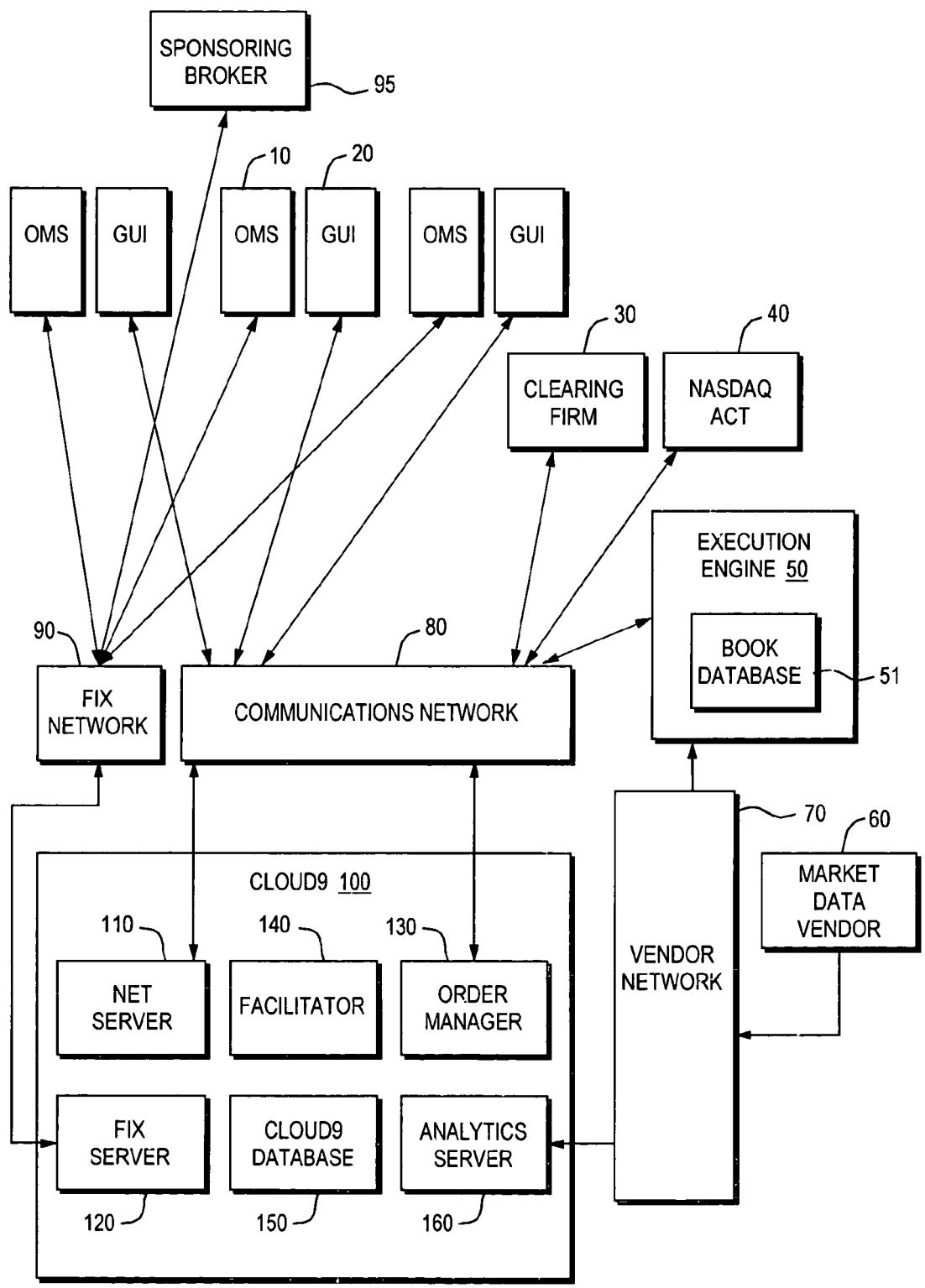
FIG. 1 is a schematic view of a preferred computer system embodiment of the present invention.
Figure 2:
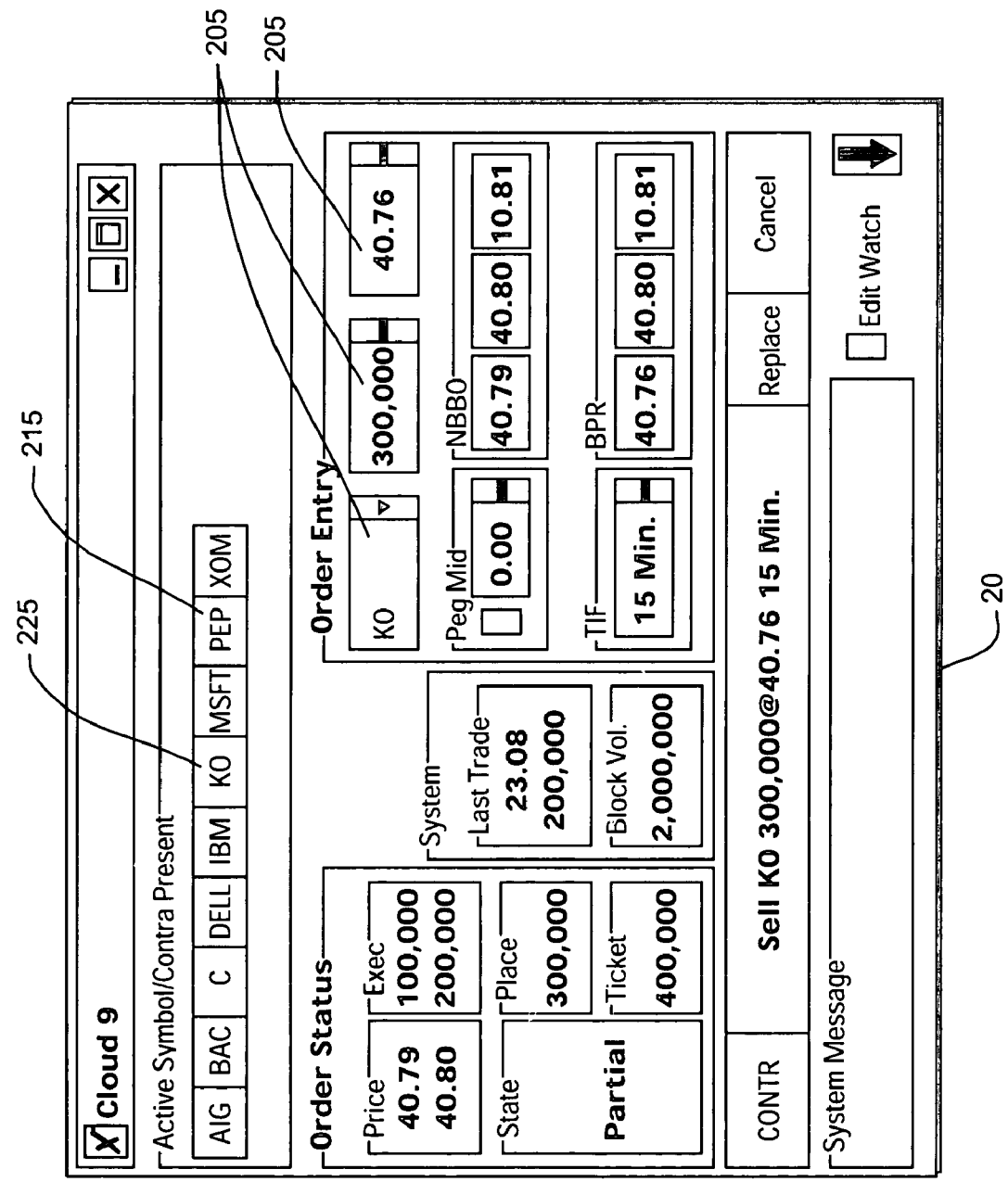
FIG. 2 depicts a preferred GUI wherein an order entry dialog is open.

In an alternate embodiment of the subject invention, the GUI 20 enables traders to access a dialog that facilitates management of a watch list of securities. The purpose of the watch list is to limit the flow of information from the system to the symbols that the trader is interested in. In this embodiment, the system preferably also enables a trader to see whether or not there is someone else with an open GUI currently watching a given symbol (this being of interest since it would increase the likelihood of a trade). In an alternate embodiment the GUI 20 enables users to see the number of traders watching a security. The GUI 20 will register for BPR update messages and for receipt of the Active Symbol and Contras Present messages only in watched securities. In the preferred embodiment the API allows a GUI to register for BPR/Active/Contras Present messages in any security, and separately register for quote update messages in a separate list of securities. The preferred GUI 20 only displays NBBO prices for one security at a time, namely the one for which the order entry dialog is open, as depicted in FIG. 2. In an alternate embodiment the GUI subscribes to NBBO updates in all watched securities and these prices are displayed next to the symbol in a drop list.

To manage the watch list, users are preferably able to add individual symbols, or add all symbols that are classified as being in a known group of securities, such as an industry group or sector. The system preferably also enables users to submit their own groups of securities in the form of an Excel file and load these groups into the system, at which point they are simply added to the list of groups of securities that the trader may choose from to populate his or her watch list.

Figure 8:
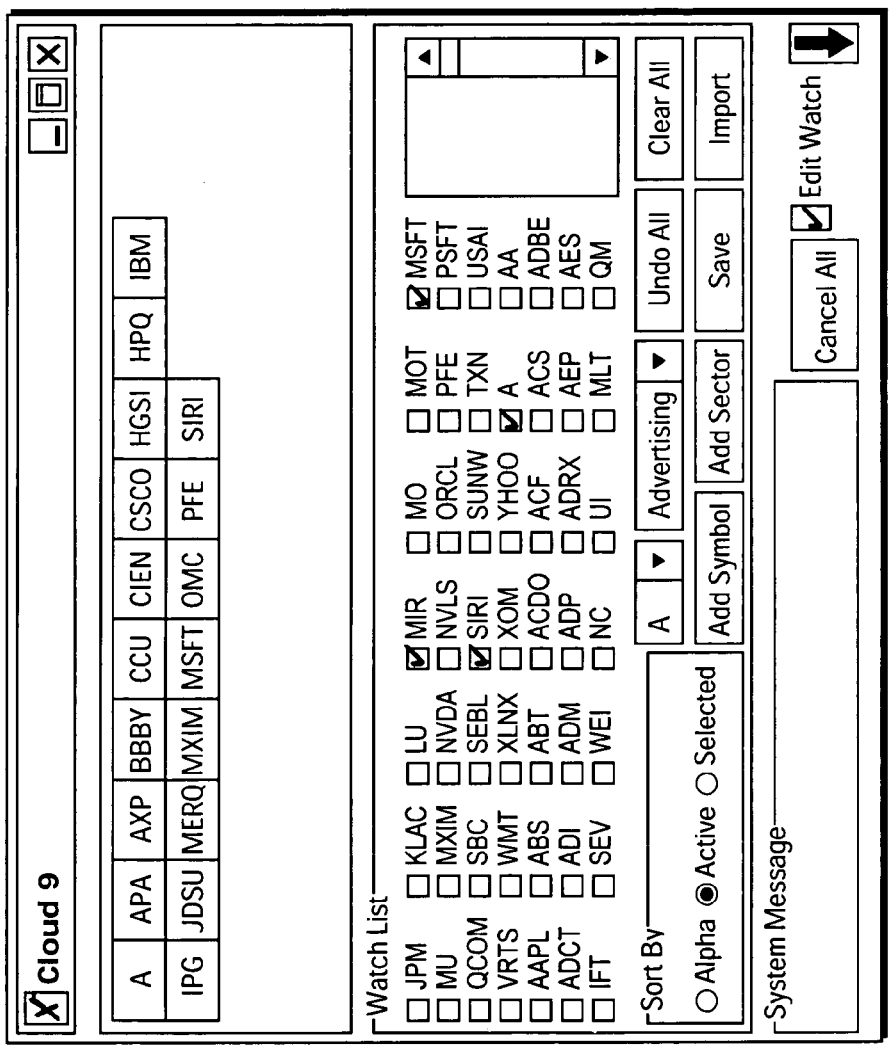
FIG. 8 depicts a preferred watch list configuration dialog.

A preferred watch list configuration dialog is depicted in FIG. 8. The user is able to add symbols or groups of symbols. The changes are in a pending status until the user saves the changes. Users can also revert to a prior saved watch list or load a group of securities from an Excel spreadsheet which can be, for example, derived from their OMS or blotter.

The watch list is preferably managed by the client and persisted on the server.

In embodiments with a watched symbol notification, Net Server 110 preferably keeps track of which symbols are being "watched" by two or more GUIs. If a symbol is added to a trader watch list, causing the number of watching clients to reach two, NetServer 110 will broadcast a message to all GUIs that subscribe to active symbol messages to indicate that the symbol is watched. If the number of watching GUIs drops to one, NetServer will broadcast a message to the GUIs that subscribe to active symbol updates to indicate that this symbol is no longer being watched. In an alternate embodiment the message is sent any time a user adds or removes a watch on the symbol and gives the symbol, timestamp, and updated number of parties watching the symbol.

The GUI 20 preferably shows all symbols that are both in the trader's watch list and are either active or have contras present, by highlighting them on the top of the GUI through color-coded rectangles, using the color orange for active symbols in embodiments that comprise an ACTIVE SYMBOL notification, yellow for CONTRA PRESENT notifications. In an alternate embodiment the messages indicating that a watched symbol has become active or has contras present is displayed by means of a temporary popup screen, similar to instant messenger applications. In another alternate embodiment these popup messages stay visible until action is taken, either by clicking to generate an order entry dialog and entering an order in response to the message, or by clicking on a "close" or "minimize" button to either close the popup or reduce it to a bar at the bottom of the screen.

The trader GUI 20 in the preferred embodiment has the option of showing or not showing the symbols on their watch list that are in a "watched" state (i.e., at least one other trader is watching this symbol). If they choose to see these symbols, when they are not "active" or with contras present they will be represented in a third color that is less striking than the other two since the trader's attention is not immediately required; in the preferred embodiment the GUI 20 presents watched symbols in a gray rectangle next to the active and contras present rectangles.

The NetServer 110 preferably exposes an API for remote clients to access the system's services. The API preferably enables the user to open a session though basic authenticating (username password) prior to using any trading services. In an alternate embodiment the client authenticates itself with a certificate. The exchange of user credentials is preferably done via a SSL session, which exchanges encryption keys using the Net Server public key. Once the user is authenticated the session maps to the users identity.

The NetServer API preferably exposes the following functions.

- Get Sector List: Each firm can optionally have securities arranged by sector or other security grouping. The security groupings can be configured per client firm. The API returns the list of securities associated with the client's firm and group name.
- Get Security List: The system has a list of configured securities. This function returns that list. Each element of the list is the Symbol, Company Name, and Sector.
- Set & Get Trader Defaults: The system enables a client to store default parameters. The following list is not intended to be exhaustive, but contains some of the trader defaults that are of particular interest; others will be apparent to those skilled in the art.
  - Default Placed amount. The order entry dialog will populate the quantity field by default with either the minimum quantity for this symbol (Large Block Quantity) or with the trader's total ticket size, if this trader uses tickets.
  - Default Price. The order entry dialog will populate the price field with a limit price chosen via one of the following rules: Aggressive end of the NBBO, passive end of the NBBO, NBBO Midpoint; and for embodiments that comprise a BPR, the aggressive end of the BPR, passive end of the BPR, or BPR midpoint.
  - Default TIF. The order entry dialog will populate the time in force field with this number of seconds.
  - Default Watch List Management (Security, Sector). All watch list management is handled by the front end and persisted on the server.
  - Default Peg and offset. The order entry dialog will select or not select the Peg option by default and if selected, it will add this number of cents as peg offset for buy orders, or subtract this number of cents to the midpoint peg for sell orders.
  - Ticketed Orders Only. This option determines whether a trader wishes to check orders against the size reserved by means of a ticket. If this option is not selected, the trader will be able to enter orders even when there is no corresponding ticket.
- Set & Get Sector Watch List: Save and retrieve a list of securities that comprises a sector or other group.
- Set & Get Symbol Watch List: Save and retrieve the list of securities that are in a given watch list.
- Set & Get GUI Defaults:
  - Ticket Management Grid: option to start the application with the window that displays the list of tickets open or hidden.
  - Ticker Management Grid definition: font, field order, col size, col type, headers and field=col mappings.
  - Color Changes (Yes, No): The GUI preferably allows users to select this option to highlight any field of an order in the order entry dialog when the order has already been submitted to the system and this field has since been edited. When a field has been edited the user can press a "replace" key to send the new value to the system via a Cancel/Replace order message. Highlighting the fields that have been edited assists the user in managing an order.
- Get Heartbeat Interval. Number of seconds for the periodic heartbeats to determine whether the connection between the GUI 20 and Net Server 110 is operational. The system preferably imposes a lower bound on this parameter to avoid overloading NetServer 110 with connection management duties. In an alternate embodiment the parameter can only be set on the server and is not exposed via the API.
- Get Tickets: gets the user's tickets. Within the trading day, the user can only have one ticket per symbol/side. If the ticket is cancelled, the size decrements to the unexecuted size. New tickets with the same symbol and side replace the entry in the list.
- Get Orders: Gets a list of all orders.
- Get Order Status. Returns the order details for the ClientOrderID.
- Submit New Order: Queues a new order into the system. Asynchronous call that will be followed up with OnOrderUpdate or OnOrderReject event(s).
- Replace Order: This function queues a replace order request. The caller assumes the order state to be in "Pending Replace" upon return. Asynchronous call that will be followed up with OnOrderUpdate or OnOrderReject event(s). Replaced Order details are the same as New order details+OrigClientOrder ID field. The quantity is the total quantity including filled size.
- Cancel Order: This function queues a canceled order request. The caller assumes the order state to be "Pending Cancel" upon return. Asynchronous call that will be followed up with OnOrderUpdate or OnOrderCancelled event(s).
- Execute Trade. This function requests that this trade be reported to the sponsoring broker to set up allocation process. This would be done automatically at the end of the trading day.

Get Trades for (ClientOrderID, Symbol, or ALL) Request/response to retrieve trade details. There are preferably three versions of this request. Get trades for an order, for all orders in a security, or for all trades for this GUI client.

The following are API events—i.e., messages produced by the system and pushed to the GUI 20 through the API.

OnTicketUpdate: this event is raised on new, replaced, and cancelled ticket events.

OnOrderUpdate: Event raised on order state changes. This includes order management responses to the requests above or through other channels.

OnOrderReject: Event is raised in response to a new/replace order request entered within this session.

OnCancelReject: Event is raised when a cancel request is rejected.

OnTrade event is raised when there is a trade within one of the traders orders entered through this API or another channel.

The preferred embodiment of the NetServer 110 also provides an interface for subscribing to market data per security, and storing the data on a computer readable medium such as a hard disk. Fields include: (NBBO bid, ask and TapeTimeStamp), (BPR Low and High), Block Tape (Last and total volume), Active Symbol, Contras Present, Security State (open, closed, halted, etc), and timestamp. The functions exposed in the preferred embodiment of this interface are:

Subscribe Request/Response: This function preferably adds a list of securities provided in the request message to the client's subscription list. The request returns a snapshot of that entry's current data for the requested fields. Subsequent changes to the watched fields will raise an update event (OnUpdate) with the changes.

Unsubscribe Request/Response: Removes the subscription request.

OnUpdate Event: Notifies the subscriber of field changes within a Subscription entry.

Start Active Symbol Feed Request/Response: Returns a list of all symbols where the active symbol flag is set. Subsequent to the call, all state changes in active symbol flag changes will result in OnActiveSymChange(Symbol, On/Off).

Stop Active Symbol Feed Request/Response: terminates above event notifications.

OnActiveSymChange event notifies the subscriber of active symbol flag changes

Research Data Storage. The system preferably stores information on the system's activity on to a computer readable medium such as a hard disk or tape. This stored data enables operators and research staff to monitor various gauges of system activity, and particularly to evaluate how different measures of trader activity in a symbol correlate to the fill rate when a user enters an order. This information plays an important role in steering usage of the system toward workflows that lead to greater success, through marketing media and visits to the traders' workstations. For example, if the fill rate following entry of an order in a security that is not watched is extremely low or null, traders may be advised to focus their trading on the system in securities that are watched by other traders. The system preferably also can be reconfigured to modify the rules of when flags are sent out, to improve fill rates in the system. For example, if it is determined that fill rates are substantially higher when there are three or more traders watching the security than two, then the system can be reconfigured to send out the watched symbol message only when the total number of GUI users is three or more, rather than two or more. The above examples are intended for the purpose of illustration and not to provide an exhaustive list; other optimizations based on modifications of parameters given above will be apparent to those skilled in the art.

The trader activity measures are available on the help desk, and exported to a permanent data repository at the end of each day for offline analysis with the purpose of finding correlations between possible system configuration settings and higher fill rates.

The measures of interest are:

Order activity (entry, BPR aggression changes; cancel/expire)

Fills

Tickets

Number of traders that can see the symbol active flag (on watch list, as a symbol, or as part of a sector)

Number of traders that can see the BPR updates (subscribers)

Number of traders that can see the quote updates (subscribers)

The data tables below (A-D) are stored in standard comma-delimited (CSV) format.

TABLE A

Ticket Table

|  | Description | Type |
|---|---|---|
| Timestamp | To hundredth of a second | HHMMSSCC |
| Symbol |  | CHAR[5] |
| Quantity | Multiple of the Large Block Qty | INT |
| Side | Buy, Sell | Enum |

TABLE B

Order Table

|  | Description | Type |
|---|---|---|
| Timestamp | To hundredth of a second | HHMMSSCC |
| Symbol |  | CHAR[5] |
| Quantity | Multiple of the Large Block Qty | INT |
| Side | Buy, Sell | Enum |
| BPR | Yes/No | Boolean |
| Status | Open, Rejected, Canceled, Expired, Filled | Enum |

TABLE C

Trades Table

|  | Description | Type |
|---|---|---|
| Timestamp | To hundredth of a second | HHMMSSCC |
| Symbol |  | CHAR[5] |
| Quantity | Multiple of the Large Block Qty | INT |
| Side | Buy, Sell | Enum |

TABLE D

Watch List Table

|  | Description | Type |
|---|---|---|
| Timestamp | To hundredth of a second | HHMMSSCC |
| Symbol |  | CHAR[5] |

TABLE D-continued

Watch List Table

| | Description | Type |
|---|---|---|
| SymbolActiveWatchers | Number of clients who are able to see the symbol active flag (symbol is on their watch list) | INT |
| BPRWatchers | Number of clients watching the symbol BPR updates | INT |
| QuoteWatchers | Number of clients watching quote updates for the symbol | INT |

Analytics Server.

The Analytics Server 160 in the preferred embodiment keeps track of the National Best Bid and Offer prices by listening to a vendor quote feed 60 and updating said NBBO prices when the quote that made the best price is either canceled or improved by a new quote with a better price. The current NBBO prices are preferably stored in computer readable memory such as a hard disk or tape. In addition to the NBBO prices, Analytics Server 160 calculates a Block Bid and a Block Offer based upon recent quote and trade data.

The Analytics Server's main function is to produce the following messages:
  NBBO price changes, and
  for embodiments that comprise a Block Price Range, BPR Update messages.

Analytics Server 160 stores last sale data and all changes in the inside bid or offer prices throughout the day, in all supported securities. The data that needs to be stored for analysis is described in the Tables E and F.

TABLE E

Inside Market Price Updates

| | Description | Type |
|---|---|---|
| Timestamp | To hundredth of a second | HHMMSSCC |
| Symbol | Primary market symbol for the security | CHAR[5] |
| ChangeType | New Bid, New Offer, Both | Enum |
| BidPrice | In unit 1 cent ticks | FLOAT.2 |
| OfferPrice | In unit 1 cent ticks | FLOAT.2 |
| SecurityState | Trading state of the security (open, closed, halted, etc) | Enum |

TABLE F

Last sale

| | Description | Type |
|---|---|---|
| Timestamp | To hundredth of a second | HHMMSSCC |
| Symbol | Primary market symbol for the security | CHAR[5] |
| Quantity | Size of the trade | INT |
| Price | To tenths of a penny | FLOAT.3 |

The Analytics Server 160 delivers quote update messages to all connected clients whenever there is a change in the inside market best bid price or best offer price. The update message carries the new bid price or new offer price and timestamp associated with the appearance or removal of the quote that changed this bid or offer.

The Analytics Server 160 preferably also updates the BPR every 60 seconds, and in the embodiments with a BPR, sends a BPR Update message to the Order Manager 130 for the purpose of determining the price aggression of its orders and to Net Server 110 for broadcasting to GUI Clients 20.

The embodiments that comprise a Block Price Range calculation comprise a replaceable module that is responsible for calculating the BPR. The BPR can be calculated using methods known to those skilled in the art, such as for example by taking a Block Bid equal to the National Best Bid price minus 5 cents, and a Block Offer equal to the National Best Offer plus five cents. In another example, the amount of cents to be added (subtracted) to (from) the NBBO prices is set in proportion to the historical volatility of the stock, so that for very volatile symbols such as technology issues the variation might be greater than 5 cents, while it would be less for more steady stocks such as blue chip utilities.

Figure 9:
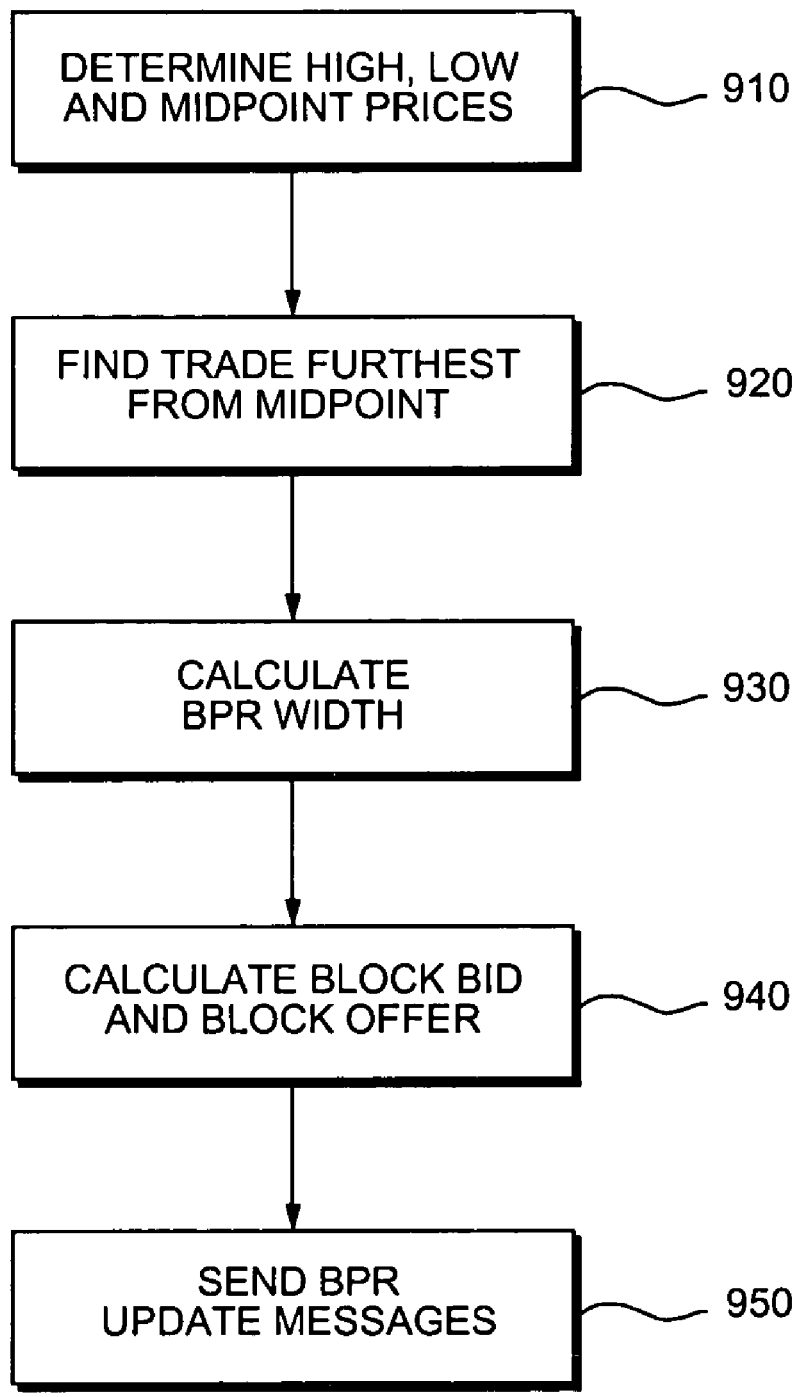
FIG. 9 depicts steps of a preferred method for calculating the BPR.
Figure 10:
FIG. 10 depicts a preferred GUI wherein watched securities are identified.

An example of a more accurate algorithm to calculate the BPR considers the highest and lowest prices that have traded in the past 60 seconds, H and L respectively, as well as the current NBBO Midpoint price M, and calculates the Block Bid and Block Offer through the following steps [FIG. 9]:

Step 910. Determine the prices H, L and M for a given security as defined above.

Step 920. Looking at last sale data back to the timestamp of the last BPR update, find the trade that was printed furthest from the current NBBO midpoint. Let X denote the absolute price difference between this trade price and the current NBBO midpoint. Thus, X is the greater of H-M and M-L.

Step 930. Let $Z=Y+(MaxBlockSpread/2-Y)*(1+1/(1+\exp(-BETA*X))$, where Y is a parameter set per security that sets a lower bound on the spread between the Block Bid and Best Offer, MaxBlockSpread is the upper bound on said spread, and BETA is a parameter, which can be set to 10.0 for example.

Step 940. Calculate the Block Bid to be equal to M+Z, and Block Offer equal to M−Z.

Step 950. Issue BPR Update messages to the Order Manager 130 and NetServer 110.

These examples are intended for the purpose of illustration: other means of calculating a Block Price Range will be easily imagined by those skilled in the art.

Credit Management. The system preferably enables sponsoring brokers to set credit limits on their customers' accounts. In the preferred embodiment, credit checking is based on a gross dollar limit, counting the total value of shares bought plus shares sold. Orders will be validated for credit based upon the greater of the top of the BPR or the order's limit price, and credit will be adjusted based upon the actual credit amount consumed when the order is completely filled, expired, or canceled (on partial fills).

Brokers will be given a web account to manage credit; they can view the level of credit currently consumed by a client, but only binned as follows: less than 25%; 25-50%; 50-75%; more than 75%.

Brokers must be able to increase today's credit with immediate effect; or they can increase or reduce the amount of credit that gets refreshed at the start of each trading day. A broker can also suspend credit; this has effect both intraday and for following days. If day's credit is suspended, the system will cancel all open orders.

The broker can later un-suspend credit for a client. Suspensions have permanent effect and persist into the next day. Credit is refreshed at the end of the day.

The broker will be able to set up a credit alert threshold as a percentage of the total (default=75%); additionally, the system will generate an alert whenever the available credit falls below a system-configured dollar amount MinCreditAmount that is too low to utilize the block system (for example, $2 million). Credit alerts will be delivered to Help Desk personnel and pushed to the client GUI.

Help Desk. The system preferably provides a Help desk interface to be used by personnel that handles calls from customers. This user interface can be a web browser interface, with access secured through Public Key Encryption and certificate-based authentication as well as a username and password pair. The interface preferably enables the user to view detailed information about the life of an order. The user can pull up the list of orders with a given symbol and client ID to locate the order that the customer is calling about. The help desk interface enables its user to click on an order of interest to view the following messages in chronological fashion.

Ticket, if applicable.
Order Entry request(s).
Order Entry Response: rejected (with reason code); execution pending; expired; open.
Fills.
CONTRA PRESENT notification(s) sent against an order.
Modify Order Requests, and responses (accepted, rejected).
Cancel Request and response (accepted, rejected).
Expiration.

In addition, the help desk operator is able to see the NBBO inside prices, timestamp of the most recent quote seen on the bid and offer sides, respectively, BPR prices and timestamp, on each significant event in the life of an order (entry, cancel, execution). This is of use for answering questions such as why the symbol did or did not change to an active state when the order was entered, etc.

In an alternate embodiment the help desk operator cannot view symbol or side of any order, to reduce the security risk associated with traders being aware of the trading interests of institutional customers. In this embodiment, the help desk operator identifies a caller's order by pulling up the list of orders associated with the trader, with the time of entry and size of each order as well as the ClientOrderID which is also visible on the trader's GUI 20. The help desk operator works with the trader to identify which order he or she is inquiring about, then proceeds as above by clicking on the order to view the corresponding activity trail.

In the preferred embodiment the Help Desk also enables its operator to select a client firm from a drop list, and view their configurations pertinent to trading logic. The list below gives the more important user configurations and usage statistics for the help desk operator; the list is not intended to be exhaustive, others will be easily apprehended by those skilled in the art.

Credit limit and credit consumed.
Activity by trader: number of orders, traded shares, traded dollars.
List of trader; select one to view and edit trader options.
Watch list management (add/remove symbol, add/remove industry group).
Show/don't show active symbols bar.
Show/don't show drop list of tickets.
Default ticket attributes.

The preferred embodiment also enables brokers to access a web page using the same authentication and security model as for Help Desk operators. Brokers will use this page for credit management purposes. In order to maintain the client's confidentiality, the interface preferably limits the information displayed to the broker in such a way as to not reveal the details of the client's trades. In this embodiment, the broker can view the amount of credit consumed by a client only as a percentage of the total credit limit; for example, this can be binned in four intervals: less than 25%, 25-50%, 50-75%, and greater than 75%. The sponsoring broker additionally is enabled to modify the client's credit through the following functions.

Add intraday credit.
Add credit today and also increase the refresh amount for following days.
Lower refresh amount for following days.
Suspend credit.
Unsuspend credit.

In an alternate embodiment the trades are reported to the sponsoring broker immediately and the sponsoring brokers are able to view executed trades as well as the precise amount of credit consumed. In another alternate embodiment the sponsoring broker can also view pre-trade activity.

System configurations interface. The system preferably enables an operator to modify the configurations, and add/remove a client or sponsoring broker, during an off-hours system maintenance schedule.

The system configurations interface enables the system operator to add a client and set required configurations attributes to enable the user to trade. New client firms must choose a sponsoring broker from a list of available brokers. The sponsoring broker is preferably unique for all traders within the same firm. In an alternate embodiment the same firm can use a plurality of sponsoring brokers, and the GUI 20 lets the trader select a sponsoring broker on order entry. The new firm can optionally set up a FIX connection directly to FIXServer 120, via a FIX service bureau, or through the sponsoring broker 95. In the latter case the sponsoring broker forwards FIX messages from the client to FIXServer 120 on its behalf. A firm may select two modes of FIX connectivity depending on their workflow requirements: FIX channel can be set up to receive Executions only, or to receive Executions and Order updates. They can be set up to enter tickets and check GUI-entered orders against the size allocated through a ticket, or to work without the use of tickets. When a client firm is added to the system, the Help Desk personnel will call the broker to set up any credit limits for the customer's account, and agree to a client-ID to be used for end of day reporting. New users are preferably required to configure GUI/API access to be able to trade on the system. In an alternate embodiment order entry is also supported via the FIX interface, and the user is not required to use the GUI 20 or API access.

The system configurations interface preferably also enables the system operator to add a sponsoring broker to the list of supported brokers. In an alternate embodiment the system is operated by a single sponsoring broker and cannot be accessed through a third party broker relationship. In configuring a sponsoring broker, the operator will create a user account for the sponsoring broker to manage credit for their clients' accounts as described above. Broker contact information such as a telephone number, FAX, and email must be entered and stored in the system database 150; Help Desk personnel will utilize this data to contact the broker for credit issues. To complete the process of setting up a new sponsoring broker the following steps preferably are executed.

Brokers must set up a FIX connection to receive drop copies of all executions. If the broker is also used as a service bureau for the client's OMS and sends Tickets on behalf of the clients, then this same connection will be used also for FIX connectivity to the client.
Set up end-of-day file transfers from the system containing the details of each trade, including the identity of the buy-side customer for each trade.

Optionally, set up end-of-day file transfers to the broker's clearing firm at end of day with the sell-side trade details.

The operator is further enabled to add or remove securities from the list of securities supported for trading. The securities are preferably associated with parameter values specific to the present invention, such as the Large Block Quantity and parameters utilized by the Analytics Server 160 to calculate the Block Price Range, in embodiments that comprise a Block Price Range calculation. An example of a set of required fields for a security is given in the table below.

|  | Description | Type |
|---|---|---|
| Security | Name of the security (optional blob) | String |
| Symbol | On the primary market | Char[2,3,4,5] |
| Primary market | NYSE, Nasdaq | Enum |
| LargeBlockQuantity | Orders must be multiple of this quantity | INT |
| MinBlockSpread | Minimum number of cents between the block bid and block offer | INT |
| MaxBlockSpread | Maximum number of cents between the block bid and block offer | INT |
| Beta | Squashing parameter to renormalize the Block Spread | FLOAT |

System operations. The system in the preferred embodiment preferably comprises an operations console used to provide centralized management of the servers, network hardware and trading. Operations software to support required functions is commercially available in versions that minimally provide the following features:

Real-time Display of all server statistics
Problem Summary
Problem Resolution Feedback
Remote Management/Monitoring
Intelligent Notification System (Alerts)
Alert Display, Acknowledgement, and Annotation
Audible Alarm
Logging
Online Help The operator console allows the system operators to execute the following remote actions:

System Startup
System Restart
System Shutdown
System Component Restart
System Component Shutdown
System Component Startup
System Backup
Database Backup
Inner Day Startup/Shutdown
End-of-Day Reset
Execute End-of-Day Batch Processes The system additionally enables the operations staff to generate the Daily Usage Reports at the end-of-day and extract from these the necessary information for billing, research, clearing, and OATS reporting.

The operations staff preferably also uses a system operations tool to create a clearing summary, which contains a list of trades with the broker IDs for both sides of the trade. Trading summaries pertinent to a sponsoring broker and its clearing firm contain all trades where at least the given broker sponsored one of the sides.

The system preferably also generates billing reports containing a list of all fills involving a sponsoring broker for sending to the broker. The fills should match intra-day execution reports one-to-one. The end-of-day report additionally contains the client ID, which was masked in the intraday reports. If both legs of a trade were sponsored by the same broker, there will be two fill reports in the summary file.

The preferred embodiment saves two copies of the data described below to a removable medium for archiving and analysis. Wherever possible, the logging of events includes a date-time stamp with millisecond accuracy.

System and Application Logs: The application and system logs on each machine are labeled and saved. The Log is preferably reset before begin-of-day.

Configuration Audit: The details of a begin-of-day and end-of-day audit of the firmware configuration are recorded (NT Registry, application Config, etc.).

ACT Messages: There shall be a separate log containing the details for all ACT messages. This log is preferably reset before begin-of-day.

Orders & Trades: The order and trade tables are copied to removable storage at end-of-day. A separate log for the details on order state transitions is maintained. Log and tables are preferably reset before begin-of-day.

Operation Activities: The operator activities affecting the behavior of the system are logged. The logging will be time stamped and include the identity of the operator. This log is preferably reset before begin-of-day.

All System Activity Logs and Daily Reports are preferably moved to permanent storage at the end of each trading day. System Activity Logs contain enough information to reconstruct the trading logic and pricing for each order and trade event, including time stamps required to resolve pricing disputes.

The system is preferably configured to automatically recover services in the event of an accidental failure, using processes based on the considerations below.

Loss of GUI. The GUI 20 is a required channel for Cloud9 Services. If Net Server 110 detects a loss of connectivity with the client, in the preferred embodiment all orders are automatically cancelled and the system generates an alert to help desk personnel with the phone number of any trader with canceled orders. The GUI 20 preferably shows the order status as "cancel pending". Upon reconnecting, the order status is updated to "canceled". Traders can pull up a list of orders that were canceled as a result of the connection failure and re-activate these orders; the system will treat them as new orders and process them accordingly. In an alternate embodiment, users are enabled to select a configuration where their orders would not be canceled on loss of connectivity with the GUI; in this embodiment the user will call the Help Desk to cancel orders when the connection cannot be recovered.

Loss of FIX. FIX connectivity loss preferably does not cause the cancellation of orders, because FIX is not the channel through which executable orders are managed. The operator must be alerted upon loss of a FIX connection. Upon reconnecting, the FIX client will re-synchronize with the server in accordance with the FIX protocol requirements. In an alternate embodiment FIX can be used to enter executable orders in the system and said system supports a configuration enabling users to request that their orders be automatically canceled upon loss of the FIX connection.

Analytics server. If the Analytics Server 160 is out of service, the system in the preferred embodiment will continue to function but without the benefit of functions normally implemented by the Facilitator such as new ACTIVE SYMBOL messages (for embodiments with ACTIVE SYMBOL notifications) or CONTRA PRESENT messages. The GUI 20 will also fail to receive quote updates and BPR update messages. If the Analytics Server 160 cannot be brought back on line swiftly, system operators have instructions to place the system in an off-line state where it rejects any further order entry, but does not cancel existing orders. These solutions are described as an example of how a trading system such as that in the present invention addresses reliability issues, but other solutions will easily be apprehended by those skilled in the art. For example, an alternate approach is to consider the Analytics Server 160 as a vital service and automatically take the system off line and cancel all orders upon loss of service.

NetServer, Order Manager and Facilitator. These services are closely related to vital functions of the trading system. Failure of these services is therefore considered fatal in the preferred embodiment; the operator will attempt to cancel all orders in the execution engine, or these will be canceled automatically when loss of connectivity is detected. The system automatically goes in an off-line state upon detecting failure of any of these services.

The integrity of the system is constantly monitored by a System Management Console, which runs continuously on an independent system. If, at any time during the trading day, the integrity of the system becomes uncertain, the system automatically switches to an off-line mode. At this point all orders are cancelled. All further orders are declined until the system returns to a fully operational state.

Alternate Embodiment With System-generated Calls

A well-known problem with large block crossing systems is the low probability that a large buyer and large seller enter orders at the same time. Much of the present invention is directed to solving this problem after the first trader has entered an order; but it does not in itself provide guidance as to when this first participant should be most encouraged to place an order.

The ability to focus interest in time is especially critical in relation to the desire to obtain the best possible price improvement, through the mechanisms described herein.

In an alternate embodiment, the system operates as described above, but additionally generates system-generated "call" events that focus traders' interest at times when there is indication of both buy and sell interest in the security. In another alternate embodiment the active flags are not sent and the call is the only time focusing event. The call is preferably scheduled via an algorithm that determines when the likelihood of a fill is highest. It preferably does not utilize unbalanced trade information (such as revealing the existence of buy interest in absence of any seller), so as to avoid the perception of information leaks whereby traders would feel that the orders they have placed in the system are causing unwanted information events beyond their direct control.

The purpose of the call is to attract order entry from traders when the likelihood of a fill is greatest. For example, if the average fill rate for a first trader placing an order in a given security were 5%, the fill rate when a call is open in the security might be 10% or 15%; in contrast the fill rate when there is no call would be lower than 5%; with an overall average of 5% for a trader that places orders at random times independently of any calls.

Minimally, such an alternate embodiment generates calls to focus order entry in a security when traders have placed orders on both sides but missed each other because their orders had been placed at different times. Other examples of cases where the system can generate a call will be described below. To avoid leaking information about orders that have been placed in the system, these calls will be reported at pre-scheduled times such as the 60-second BPR updates in embodiments with a BPR, rather than on the occasion of an order entry event.

|  | Description | Type |
| --- | --- | --- |
| Symbol | Primary market name for the security | CHAR[5] |
| TimeStamp | When the BPR was calculated | HHMMSSCC |
| QuoteTime | Time of last quote update prior to calculating the BPR | HHMMSSCC |
| LastSaleTime | Time of most recent tape print prior to calculating the BPR | HHMMSSCC |
| NationalBid | In whole cents | FLOAT.2 |
| NationalOffer | In whole cents | FLOAT.2 |
| BlockBid | In whole cents | FLOAT.2 |
| BlockOffer | In whole cents | FLOAT.2 |
| Call | ON/OFF | Boolean |

The algorithms to generate calls are preferably based upon the following principles.

Not triggered on order entry. Opportunities to issue a call will be evaluated at pre-scheduled times. This eliminates the fear of information leaks that would occur if a trader were to see that his or her own order can cause a call to be issued. It also prevents such a trader from discovering information about the book. For example, suppose a system rule is to issue a call when orders have been received on the buy side and the sell side. If a buyer were to trigger a call on order entry he would discover that there had recently been a seller in the system. By issuing calls at a pre-scheduled time, the call is no longer directly related to a trader's order and its interpretation does not necessarily leak any information about the side of other orders in the book.

1 Minute Minimum lifespan. Once a call has been initiated, it will stay open for a sufficient time to let traders react and respond to the call.

Two-sided. Calls will be issued only if there is evidence of block interest on both sides. This reduces potential gaming.

Not necessarily an order. Calls may be generated when there is no active order in the system; so traders may not infer the presence of orders in the system by monitoring when it issues calls.

Undisclosed rules. The rules that cause the system to issue calls are preferably periodically modified and not disclosed to participants, to reduce the risk that parasitic traders will attempt to infer information about the system's book from the timing of calls. The periodic updates also gives system operators the flexibility to adjust the rules in order to maintain a reasonable frequency of calls.

The following data is preferably available for the purpose of deciding when calls should be generated.

Tickets with remaining quantity.
Open orders.
Expired orders.
Trades.
Block prints on the tape.

Repeated prints on the tape with unusually high volume.

Rules-based Method for Issuing Calls.

A first alternate embodiment utilizes a rules-based approach for deciding when the call should be issued. The Activity Evaluation process is executed together with the BPR Update process, for each symbol.

If there isn't already a call, the rules given below are preferably applied to decide if a symbol should be called depending on activity in the system (orders, trades, etc.) and on the market. If any of the Boolean rules are true, the symbol will be called.

If a symbol is already called, has been called for at least <60> seconds (configurable global parameter), and there is no contras present flag in the security, the system preferably removes the call.

Rules that lead to a call are listed in the bullet points below.

- An order was entered and has expired. Later, another order is entered on the contra side. At the next regularly scheduled time, check whether a call has been posted in this symbol in the last 30 minutes (configurable ActiveMaxDelay1), and if not, post the call in this symbol.
- An order was entered and has expired. Later, a block print is detected on the tape (greater than 10000 shares or $250,000, again these are all configurable parameters), and the call has not been posted in the last 90 minutes in this symbol (configurable ActiveMaxDelay2).
- Discretionary: a help desk operator types the symbol and clicks on a button.
- An order was entered and a ticket exists on the contra side.
- An order was entered in a symbol that has traded within the last <30> minutes.
- A resident order was priced passively and a new order has arrived on the contra side with an aggressive price.
- A resident sell order is aggressive and repeated prints are detected on the tape indicating aggregate buys at the offer for a block size; or vice versa for a buy order in the system and evidence of block selling on the market.

The above list is intended for illustration only and is not exhaustive. Other rules that could be used to identify when there is a greater likelihood of a trade will easily be apprehended by those skilled in the art.

Score Function Method for Issuing Calls.

Another alternate embodiment with calls utilizes a score function to determine when to generate a call, as described next.

The Call Evaluation process is executed together with the BPR Update process, per symbol. If there is not currently a call in this symbol, the system calculates both an activity score and threshold for the symbol, as described below. If the score exceeds the threshold, the system preferably generates a call for this symbol.

If a symbol is already called, has been called for at least <60> seconds (configurable global parameter), and there is no contras present flag in the security, the system preferably removes the call.

The system preferably calculates the score function via two steps.

Step 1: compute the Buyside Interest and Sellside Interest in the security by adding weights associated with the following conditions.

OpenOrderCondition. Buy (sell) order currently open and priced aggressively.

PassiveOrderCondition. Buy (sell) order currently open but priced passively.

ExpiredOrderCondition. Buy (sell) order expired recently.

TicketCondition. Buy (sell) ticket with remaining quantity.

BlockTapeCondition. Recent Large Block Fill on Cloud9.

MarketPrintCondition. Block print on the tape for at least <BlockQty=10000> shares or <BlockValue=$250,000>, printed above (below) the midpoint, having taken place since the last scheduled call evaluation time.

RandomRefreshCondition. Repeated prints above (below) the midpoint since the last call evaluation time with total quantity above <BlockQty=10000> shares or <BlockValue=$250,000>, at a rate that exceeds <LiquidityRatio=2> times the average volume for the security.

WatchListCount. Number of traders that have this symbol on their watch lists.

The table below gives an example of a reasonable configuration for the weights.

|  | Description | Weight |
|---|---|---|
| OpenOrderCondition | Order within BPR | 20 |
| PassiveOrderCondition | Passive order | 10 |
| ExpiredOrderCondition | Expired order | 5 |
| TicketCondition | Ticket | 4 |
| BlockTapeCondition | Cloud9 trade | 3 |
| MarketPrintCondition | Big print on the tape | 2 |
| RandomRefreshCondition | Buy (sell) pressure on the market | 1 |
| WatchListCount | Number of traders with this symbol on watch. | INT |

Step 2: Compute the symbol activity score as the product of the Buyside Interest times the SellSide Interest.

The system preferably calculates the threshold as follows. The threshold is equal to zero if the symbol has never been called. If the symbol has previously-been called, the threshold for this symbol will be equal to an exponential function of the time since the last call expired in this symbol:

$$\text{Threshold} = \text{MaxThreshold} * \text{EXP}(-\text{Beta} * \text{TimeDelay})$$

The parameters MaxThreshold and Beta are preferably configurable per security.

In embodiments with a system call, the system can match orders continuously as in the above-described embodiments, or accumulate orders without any matching taking place until the expiration of a scheduled call period, and release them at that point to the Execution Engine in order of side, price and time, as described above. The latter method produces a call auction environment that can operate contiguously with the regular trading that takes place in the present system, where the system automatically generates a call when it finds activity to justify such a step, and then holds all orders for the call period to accumulate sufficient orders in order to obtain the best chance of price improvement for aggressive participants. In this embodiment, for example, the continuous matching may operate with a low minimum quantity requirement (such as 100 shares) and automatically trigger a call for a large block auction (for example 100,000 shares) when it finds indications of block interest on both sides. When executing delayed calls, the system preferably limits itself to a single clearing price per call auction as follows: having ranked orders as described above and begun to place them in the Execution Engine 50 one by one, when the first trade is executed all subsequent orders are re-priced as needed to ensure that their limit is not more aggressive than the first traded price on the occasion of this call. Unmatched orders are preferably expired after all orders have been entered and all possible matches executed.

Alternate Embodiment with Targeted ACTIVE SYMBOL Messages

In an alternate embodiment, the system operates as described above for the alternate embodiment with an ACTIVE SYMBOL notification, except that the active symbol message is sent only to traders who have provided certified trading interest information indicating a likely interest in either buying or selling a large block of this security. For example, such certified trading interest information may be a drop copy of execution reports that brokers issue following each trade, and the selection criteria may be that the firm has bought net (or sold net) at least 10,000 shares of stock within the last 30 minutes. Other examples are described extensively in the following co-pending U.S. patent applications: Ser. No. 09/585,049, filed Jun. 1, 2000; Ser. No. 09/750,768, filed Dec. 29, 2000; and Ser. No. 09/870,845, filed May 31, 2001, the entire contents of each of which are incorporated herein by reference.

Alternate Embodiments of the CONTRA PRESENT Notification

In an alternate embodiment the CONTRA PRESENT notification also displays the price of the counter-offer, so the party receiving said notification can decide whether to accept said counter-offer directly rather than having to propose a price.

Alternate embodiments of the system utilize different rules for determining who is eligible to receive the CONTRA PRESENT notification, which are of particular interest in light of the Quote rule and the order display rule. The quote rule requires quoting Market Participants to represent their best-priced order in their quote; whereas the order display rule requires that if a price is shown to more than one other party, it must necessarily be shown and made available to the entire marketplace. Both rules create potential hurdles to the deployment of the system subject of the present invention, if one decides to view the CONTRA PRESENT notification as a quote. An alternate embodiment addresses this situation by showing the CONTRA PRESENT notification to one party only; choosing for this purpose the order with the highest matching priority. An opposite approach consists in an embodiment where the CONTRA PRESENT notification is shown to all users, regardless of whether or not they have an order in the system. Of course, only users with orders in the system will be able to infer the side of the contra interest; for example a user with a Buy order in the system will know that there is at least one seller within the system, as well as possibly multiple other buyers. A user who does not have an order in the system will know that there is at least one buyer and at least one seller, but would not know which side is more aggressive than the other. Since such two-sided information is not damaging to the trading interests of the participants it is an acceptable leak of information to release this information the entire marketplace.

While the embodiments shown and described herein are fully capable of achieving the objects of the subject invention, it is evident that numerous alternatives, modifications, and variations will be apparent to those skilled in the art in light of the foregoing description. These alternatives, modifications, and variations are within the scope of the subject invention, and it is to be understood that the embodiments described herein are shown only for the purpose of illustration and not for the purpose of limitation.

What is claimed is:

1. A method for facilitating trading of securities over a computer system, comprising the steps of:
   electronically receiving market data including prices for a security;
   calculating with a first processor a reference price for said security based at least partially on said market data;
   electronically storing said reference price in a computer readable medium;
   electronically receiving a first order regarding said security from a first user, wherein said first order is a sell order that comprises a first price limit and a first quantity limit;
   electronically storing said first order in a computer readable medium;
   electronically receiving a second order regarding said security from a second user, wherein said second order is a buy order that is contra to said first order and comprises a second price limit that is less than said reference price and a second quantity limit;
   electronically storing said second order in a computer readable medium;
   comparing price aggression of said first order and said second order to said reference price; and
   executing with a second processor a trade comprising said first order and said second order at a trade execution price different from said reference price, wherein said trade execution price complies with said first price limit and said second price limit, and wherein said trade execution price is calculated to minimize a difference between said reference price and said trade execution price and is based on said comparing price aggression of said first order and said second order to said reference price,
   wherein said first and second processors may be the same processor.

2. A method as in claim 1, wherein said second user is allowed to increase price aggression only after the expiration of a predetermined period of time.

3. A method as in claim 1, wherein said reference price is based on recent market prices.

4. A method as in claim 1, further comprising displaying said reference price to one or more remotely located users by means of a graphic user interface.

5. A method for facilitating trading of securities over a computer system, comprising the steps of:
   electronically receiving market data including prices for a security;
   calculating with a first processor a reference price for said security based at least partially on said market data;
   electronically storing said reference price in a computer readable medium;
   electronically receiving a first order regarding said security from a first user, wherein said first order is a sell order that comprises a first price limit that is greater than said reference price and a first quantity limit;
   electronically storing said first order in a computer readable medium;
   electronically receiving a second order regarding said security from a second user, wherein said second order is a buy order that is contra to said first order and comprises a second price limit and a second quantity limit;
   electronically storing said second order in a computer readable medium;
   comparing price aggression of said first order and said second order to said reference price; and
   executing with a second processor a trade comprising said first order and said second order at a trade execution price that is different from said reference price, wherein said trade execution price complies with said first price limit and said second price limit, and wherein said trade execution price is calculated to minimize a difference between said reference price and said trade execution price and is based on said comparing price aggression of said first order and said second order to said reference price, wherein said first and second processors may be the same processor.

6. A method as in claim 5, wherein said second user is allowed to increase price aggression only after the expiration of a predetermined period of time.

7. A method as in claim 5, wherein said reference price is based on recent market prices.

8. A method as in claim 5, further comprising displaying said reference price to one or more remotely located users by means of a graphic user interface.

9. A method for facilitating trading of securities over a computer system, comprising the steps of:
- electronically receiving market data including prices for a security;
- calculating with a first processor a reference price for said security based at least partially on said market data;
- electronically storing said reference price in a computer readable medium;
- electronically receiving a first order regarding said security from a first user, wherein said first order is a buy order that comprises a first price limit that is less than said reference price and a first quantity limit;
- electronically storing said first order in a computer readable medium;
- electronically receiving a second order regarding said security from a second user, wherein said second order is a sell order that is contra to said first order and comprises a second price limit and a second quantity limit;
- electronically storing said second order in a computer readable medium;
- comparing price aggression of said first order and said second order to said reference price, and
- executing with a second processor a trade comprising said first order and said second order at a trade execution price that is different from said reference price, wherein said trade execution price complies with said first price limit and said second price limit, and wherein said trade execution price is calculated to minimize a difference between said reference price and said trade execution price and is based on said comparing price aggression of said first order and said second order to said reference price,
- wherein said first and second processors may be the same processor.

10. A method as in claim 9, wherein said second user is allowed to increase price aggression only after the expiration of a predetermined period of time.

11. A method as in claim 9, wherein said reference price is based on recent market prices.

12. A method as in claim 9, further comprising displaying said reference price to one or more remotely located users by means of a graphic user interface.

13. A method for facilitating trading of securities over a computer system, comprising the steps of:
- electronically receiving market data including prices for a security;
- calculating with a first processor a reference price for said security based at least partially on said market data;
- electronically storing said reference price in a computer readable medium;
- electronically receiving a first order regarding said security from a first user, wherein said first order is a buy order that comprises a first price limit and a first quantity limit;
- electronically storing said first order in a computer readable medium;
- electronically receiving a second order regarding said security from a second user, wherein said second order is a sell order that is contra to said first order and comprises a second price limit that is greater than said reference price, and a second quantity limit;
- electronically storing said second order in a computer readable medium;
- comparing price aggression of said first order and said second order to said reference price, and
- executing with a second processor a trade comprising said first order and said second order at a trade execution price different from said reference price, wherein said trade execution price complies with said first price limit and said second price limit, and wherein said trade execution price is calculated to minimize a difference between said reference price and said trade execution price and is based on said comparing price aggression of said first order and said second order to said reference price,
- wherein said first and second processors may be the same processor.

14. A method as in claim 13, wherein said second user is allowed to increase price aggression only after the expiration of a predetermined period of time.

15. A method as in claim 13, wherein said reference price is based on recent market prices.

16. A method as in claim 13, further comprising displaying said reference price to one or more remotely located users by means of a graphic user interface.

* * * * *